(12) United States Patent
Kang et al.

(10) Patent No.: US 11,525,619 B2
(45) Date of Patent: Dec. 13, 2022

(54) DEFROSTING APPARATUS AND REFRIGERATOR COMPRISING SAME

(71) Applicant: LG Electronics Inc., Seoul (KR)

(72) Inventors: Woocheol Kang, Seoul (KR); Jeahyuk Wie, Seoul (KR); Geunhyung Lee, Seoul (KR); Minjae Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 16/616,794

(22) PCT Filed: Oct. 11, 2017

(86) PCT No.: PCT/KR2017/011166
§ 371 (c)(1),
(2) Date: Nov. 25, 2019

(87) PCT Pub. No.: WO2018/216858
PCT Pub. Date: Nov. 29, 2018

(65) Prior Publication Data
US 2020/0080763 A1    Mar. 12, 2020

(30) Foreign Application Priority Data
May 25, 2017 (KR) ........................ 10-2017-0064812

(51) Int. Cl.
*F25D 21/12* (2006.01)
*F25D 21/00* (2006.01)
(Continued)

(52) U.S. Cl.
CPC ........... *F25D 21/12* (2013.01); *F25D 21/004* (2013.01); *F25D 21/08* (2013.01); *F25D 23/006* (2013.01);
(Continued)

(58) Field of Classification Search
CPC ................................. F25D 21/08; F25D 21/12
See application file for complete search history.

(56) References Cited

U.S. PATENT DOCUMENTS

| | | | |
|---|---|---|---|
| 2,081,479 A * | 5/1937 | Fink | F25D 21/002 62/82 |
| 2003/0131614 A1 * | 7/2003 | Jeong | F25D 21/006 62/156 |

FOREIGN PATENT DOCUMENTS

| | | |
|---|---|---|
| JP | H07120132 | 5/1995 |
| JP | H08313144 | 11/1996 |

(Continued)

OTHER PUBLICATIONS

KR Notice of Allowance in Korean Appln. No. 10-2017-0064812, dated Jul. 8, 2021, 4 pages (with English translation).

(Continued)

*Primary Examiner* — Jianying C Atkisson
*Assistant Examiner* — Meraj A Shaikh
(74) *Attorney, Agent, or Firm* — Fish & Richardson P.C.

(57) ABSTRACT

A defrosting apparatus comprises a heater case comprising a heat pipe seating part formed to extend from one surface thereof in a recessed shape and a heater receiving part formed to extend to be parallel with the heat pipe seating part. The defrosting apparatus also includes a heater which is mounted in the heater receiving part so as to emit heat when power is applied thereto, a heat pipe which has a flow path through which a working fluid filled therein flows, which has a part seated on the heat pipe seating part, and which is disposed to be adjacent to a cooling pipe of an evaporator such that heat is radiated to the cooling pipe of the evaporator by means of the working fluid at a high temperature which is heated by the heater and then is transferred, and a holder which is detachably coupled to the (Continued)

heater case so as to cover the heat pipe seated on the heat pipe seating part.

16 Claims, 26 Drawing Sheets

(51) Int. Cl.
    *F25D 21/08* (2006.01)
    *F25D 23/00* (2006.01)
    *F28D 15/02* (2006.01)
    *G05D 23/30* (2006.01)

(52) U.S. Cl.
    CPC ....... *F28D 15/0275* (2013.01); *G05D 23/303* (2013.01)

(56) References Cited

FOREIGN PATENT DOCUMENTS

| | | | | |
|---|---|---|---|---|
| JP | 2006194548 | | 7/2006 | |
| KR | 20010035326 A | * | 5/2001 | |
| KR | 200352502 | | 6/2004 | |
| KR | 20160022735 | | 3/2016 | |
| KR | 20160022735 A | * | 3/2016 | |
| KR | 1020160022735 | | 3/2016 | |
| KR | 20160046713 | | 4/2016 | |
| KR | 20160046713 A | * | 4/2016 | ............. F25B 39/02 |
| KR | 20160046714 | | 4/2016 | |
| KR | 20160046715 | | 4/2016 | |
| KR | 1020160046713 | | 4/2016 | |
| KR | 20160072642 | | 6/2016 | |
| KR | 20170032878 | | 3/2017 | |
| KR | 20170032879 | | 3/2017 | |
| KR | 20170046543 | | 5/2017 | |
| KR | 20170046544 | | 5/2017 | |
| KR | 1020170046543 | | 5/2017 | |

OTHER PUBLICATIONS

EP Extended European Search Report in European Appln. No. 17910553.1, dated Mar. 4, 2021, 8 pages.
Notice of Allowance in Korean Appln. No. 10-2021-0132591, dated Jan. 13, 2022, 7 pages (with English translation).

* cited by examiner

DEFROSTING APPARATUS AND REFRIGERATOR COMPRISING SAME

CROSS-REFERENCE TO RELATED APPLICATIONS

This application is a National Stage application under 35 U.S.C. § 371 of International Application No. PCT/KR2017/011166, filed on Oct. 11, 2017, which claims the benefit of Korean Application No. 10-2017-0064812, filed on May 25, 2017. The disclosures of the prior applications are incorporated by reference in their entirety.

TECHNICAL FIELD

The present disclosure relates to a defrosting apparatus for removing frost on an evaporator provided in a refrigeration cycle, and a refrigerator having the same.

BACKGROUND ART

A refrigerator is a machine for low temperature storage of food stored therein by using cold air generated by a refrigeration cycle in which processes of compression, condensation, expansion and evaporation are performed consecutively.

The refrigeration cycle in a refrigerating chamber includes a compressor that compresses a refrigerant, a condenser that condenses the refrigerant at a high temperature and a high pressure compressed by the compressor, and an evaporator that cools adjacent air by a cooling action that the refrigerant provided from the condenser evaporates and absorbs ambient latent heat. Capillary tubes or expansion valves are provided between the condenser and the evaporator to increase the flow rate of the refrigerant and to lower pressure so that the refrigerant induced into the evaporator may evaporate easily.

As such, the evaporator provided in the refrigeration cycle lowers ambient temperature by using cold air generated by circulation of the refrigerant flowing through a cooling pipe. In this process, when there is a difference between the temperature of the evaporator and the temperature of surrounding air, moisture in the air may be condensed and frozen on the surface of the cooling pipe and generate frost. The frost formed on the evaporator acts as a factor that lowers the heat exchange efficiency of the evaporator.

A hot wire has been used to remove the frost formed on the evaporator in the related art. However, in a defrosting structure using the hot wire, proper temperature required for defrosting was not passed on to specific parts of the evaporator, causing a problem of energy loss.

For this reason, the company to which this disclosure pertains is developing a defrosting apparatus having a new structure in which working fluid heated by a heater performs defrosting while passing through a heat pipe.

FIG. 1 to FIG. 3 are illustrating one of the defrosting apparatuses developed by the company to which this disclosure pertains [Korea Patent Application No. 10-2017-0064810 (Filed in May 25, 2017), unpublished state at the time of filing].

The defrosting apparatus 170 has a structure in which an inner flow path 171a1 is provided in a heater case 171a, and heat pipes 172c', 172c", 172d', and 172d" are inserted into an outlet 171a1' and an inlet 171a1" of the inner flow path 171a1 then are fixed by welding. Therefore, when a problem occurred in a heater 171b mounted in the heater case 171a, the entire defrosting apparatus 170 needed to be replaced.

In addition, in the defrosting apparatus 170, a heater receiving part 171a2 penetrating the heater case 171a is provided at one side of the inner flow path 171a1. The heater 171b is inserted into the heater receiving part 171a2, then the heater 171b is fixed to the heater case 171a by one side of the heater case 171a being pressed. However, in the process of pressing, there was a possibility that the heat pipes 172c', 172c", 172d', and 172d" coupled with the heater case 171a might be caught by a press apparatus and damaged.

In addition, the defrosting apparatus 170 had a structure in which a working fluid injection pipe 173 for supplying working fluid F to the inner flow path 171a1 was welded to the heater case 171a. Here, the working fluid injection pipe 173 was not only made of copper in which the material was different from the heater case 171a made of aluminum, but also was welded in a state perpendicular to the heater case 171a, so that welding was difficult and there was a possibility of slag being introduced into the inner flow path 171a1.

DETAILED DESCRIPTION OF THE DISCLOSURE

Technical Problem

A first aspect of the present disclosure is to provide a defrosting apparatus of a new structure which can be repaired without replacing the entire defrosting apparatus even if a problem occurs in a heater.

A second aspect of the present disclosure is to provide a defrosting apparatus having a new structure which can prevent breakage of heat pipes connected to a heater case in a process of inserting, pressing and fixing a heater to a heater receiving part.

A third aspect of the present disclosure is to provide a new working fluid injection structure that can solve problems of cost increase, defect rate increase, etc. which are caused by the structure that a working fluid injection hole made of copper is welded perpendicularly to a heater case made of aluminum.

A fourth aspect of the present disclosure is to provide a modification of the new working fluid injection structure in which welding points can be reduced while having the new working fluid injection structure.

Technical Solution

In order to achieve the first aspect of the present disclosure, a defrosting apparatus according to the present disclosure may include; a heat pipe which has a flow path through which a working fluid filled therein flows, and which is disposed to be adjacent to a cooling pipe of an evaporator; a heater case including a heating unit that transfers heat to the heat pipe so as to heat the working fluid, and the heating unit provides a heat pipe seating part formed to extend in a recessed shape at one surface; a heater which is mounted in the heater case so as to emit heat when power is applied thereto; and a holder which is detachably coupled to the heater case, and when coupled to the heater case, covers and fixes the heat pipe seated on the heat pipe seating part.

The heater case is provided with the heater receiving part to be penetrated through the heat pipe, the heater case is provided with a pressed portion in a shape recessed toward the heater receiving part, and the heater may be pressed by the pressed portion to be in close contact with an inner surface of the heater receiving part.

The second aspect of the present disclosure can be achieved through an assembly structure in which after mounting the heater to the heater receiving part, seating the heat pipe on the heat pipe seating part, and then fastening the holder to the heater case.

In order to achieve the third aspect of the present disclosure, the defrosting apparatus of the present disclosure may include a heating unit provided on the evaporator, a heat pipe forming a circulation flow path of the working liquid filled therein, and being partially heated by the heating unit. The heat pipe may include a main pipe formed of a first material; a first connection pipe formed of a second material and continuously connected to one end portion of the main pipe by welding, a second connection pipe formed of the second material and continuously connected to the another end portion of the main pipe by welding, and a joint pipe formed of the second material which is provided with the first connection portion connected with the first connection pipe, the second connection portion connected with the second connection pipe, and a working fluid injection portion communicating with the first and second connection portions.

In order to achieve the fourth aspect of the present disclosure, the defrosting apparatus according to the present disclosure may include a heating unit provided with a heater case having an inner flow path which has an inlet and an outlet in both ends thereof, respectively, and a heater mounted in the heater case so as to heat a working fluid within the inner flow path, a main pipe which is inserted into the heater case through the inlet and the outlet so as to be in communication with the inner flow path, and including a first and a second heat pipes disposed at front and rear of the evaporator, respectively, and one of the first and the second heat pipes is formed of a first material, a first connection pipe formed of a second material and continuously connected to one end portion of the main pipe by welding, a second connection pipe formed of the second material and continuously connected to the another end portion of the main pipe by welding, and a joint pipe formed of the second material and provided with the first connection portion connected with the first connection pipe, the second connection portion connected with the second connection pipe, and a working fluid injection portion communicating with the first and second connection portions.

Advantageous Effects

The present disclosure may obtain the following effects through the above-described solutions.

First, in the present disclosure, it has a structure that heat pipes are seated on a heater case in which a heater is mounted, and a holder is detachably coupled to the heater case to fix the heat pipes to the heater case. Therefore, when a problem occurs in the heater, since only the heater case in which the heater is mounted needs to be replaced, it is easy to repair and the repair cost can be reduced.

Second, the present disclosure has a structure that the heater is inserted into a heater receiving part and pressed and fixed therein, and then the heat pipes are seated on the heater case and the holder is coupled to the heater case. Therefore, damages to the heat pipes during an assembly process can be prevented and the convenience of assembly can be improved.

Third, the heat pipes in the present disclosure has a structure in which first and second connection pipes made of copper are connected in a straight line to both ends of a main pipe made of aluminum, and the first and second connection pipes are connected by a T-shaped joint pipe made of copper provided with a working fluid injection portion. According to the above structure, since perpendicular welding between dissimilar metals is changed to horizontal welding, and working fluid can be injected into the heat pipes through the working fluid injection portion, manufacturing cost and defect rate can be reduced.

Fourth, when each heat pipe configured by two rows is configured by a single flow path, each heat pipe is provided with a working fluid injection structure using a T-shaped joint pipe, and a total of 10 welding points (5 welding points for each heat pipe) is provided. On the other hand, when it has a structure that heat pipes are inserted into the inlet and the outlet of the inner flow path provided in the heater case and fixed by welding, only one heat pipe needs to be provided with a working fluid injection structure using a T-shaped joint pipe since the working fluid is mixed in the inner flow path. In this case, a total of seven welding points is generated, and therefore three welding points can be reduced comparing to the previous structure.

MODES FOR CARRYING OUT PREFERRED EMBODIMENTS

Hereinafter, descriptions will be given in more detail of a defrosting apparatus and a refrigerator having the same according to the present disclosure, with reference to the accompanying drawings.

For the sake of brief description with reference to the drawings, the same or equivalent components will be provided with the same reference numbers, and description thereof will not be repeated.

In addition, even though the embodiments are different each other, as long as the embodiments do not contradict each other structurally and functionally, the structure applied to one embodiment may be equally applied to another embodiment.

A singular representation may include a plural representation unless it represents a definitely different meaning from the context.

In describing the present disclosure, when a detailed explanation for a related known function or construction is considered to unnecessarily divert the gist of the present disclosure, such explanation has been omitted but would be understood by those skilled in the art.

The accompanying drawings are used to help easy understanding of the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1:
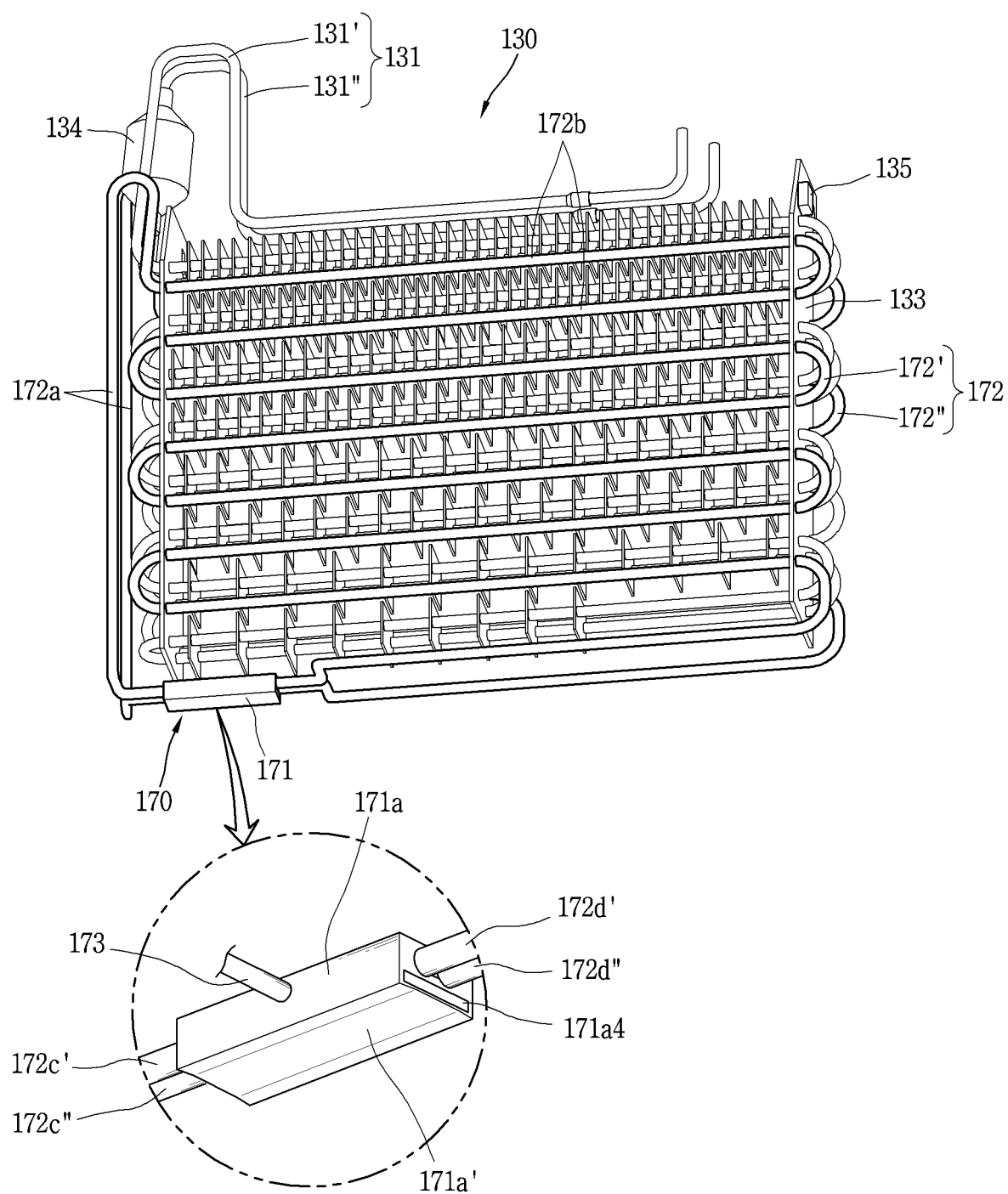
FIG. 1 is a perspective view illustrating one example of a related art defrosting apparatus developed by the company to which this disclosure pertains.
Figure 2:
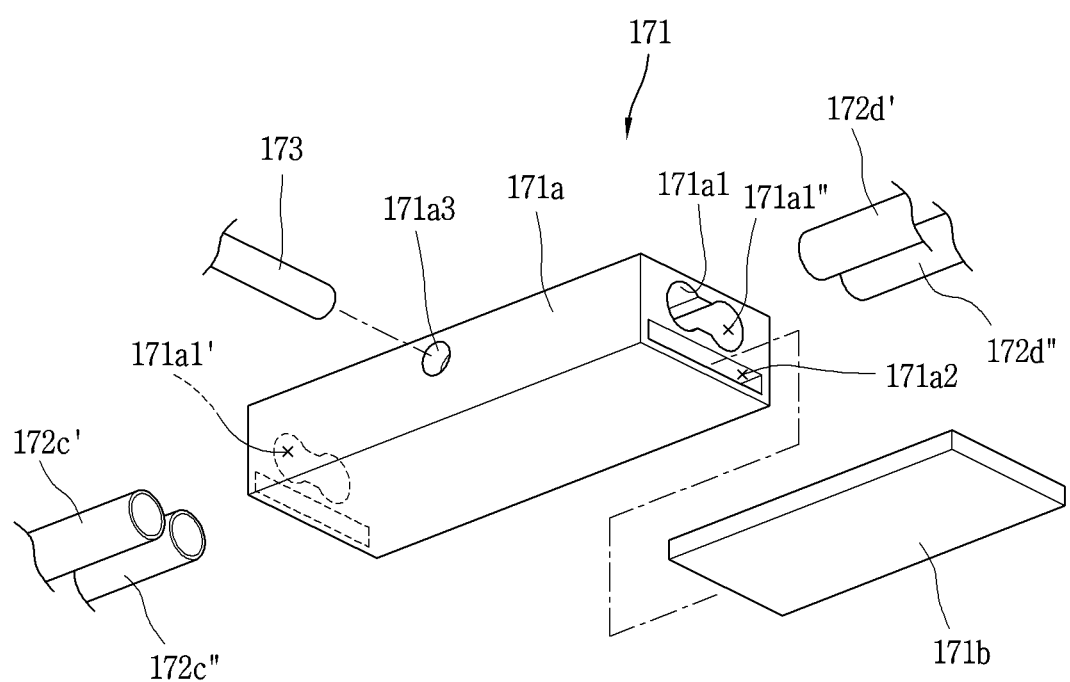
FIG. 2 is an exploded view illustrating a heating unit illustrated in FIG. 1.
Figure 3:
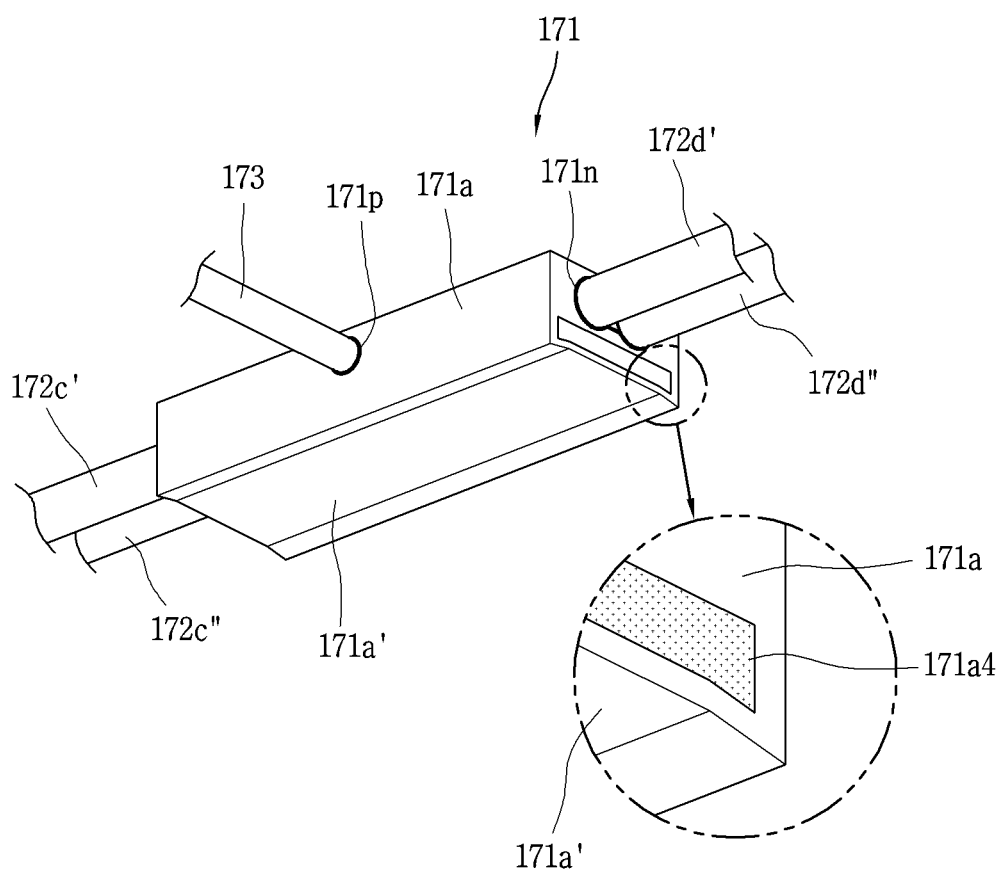
FIG. 3 is an enlarged view illustrating the heating unit illustrated in FIG. 1.
Figure 4:
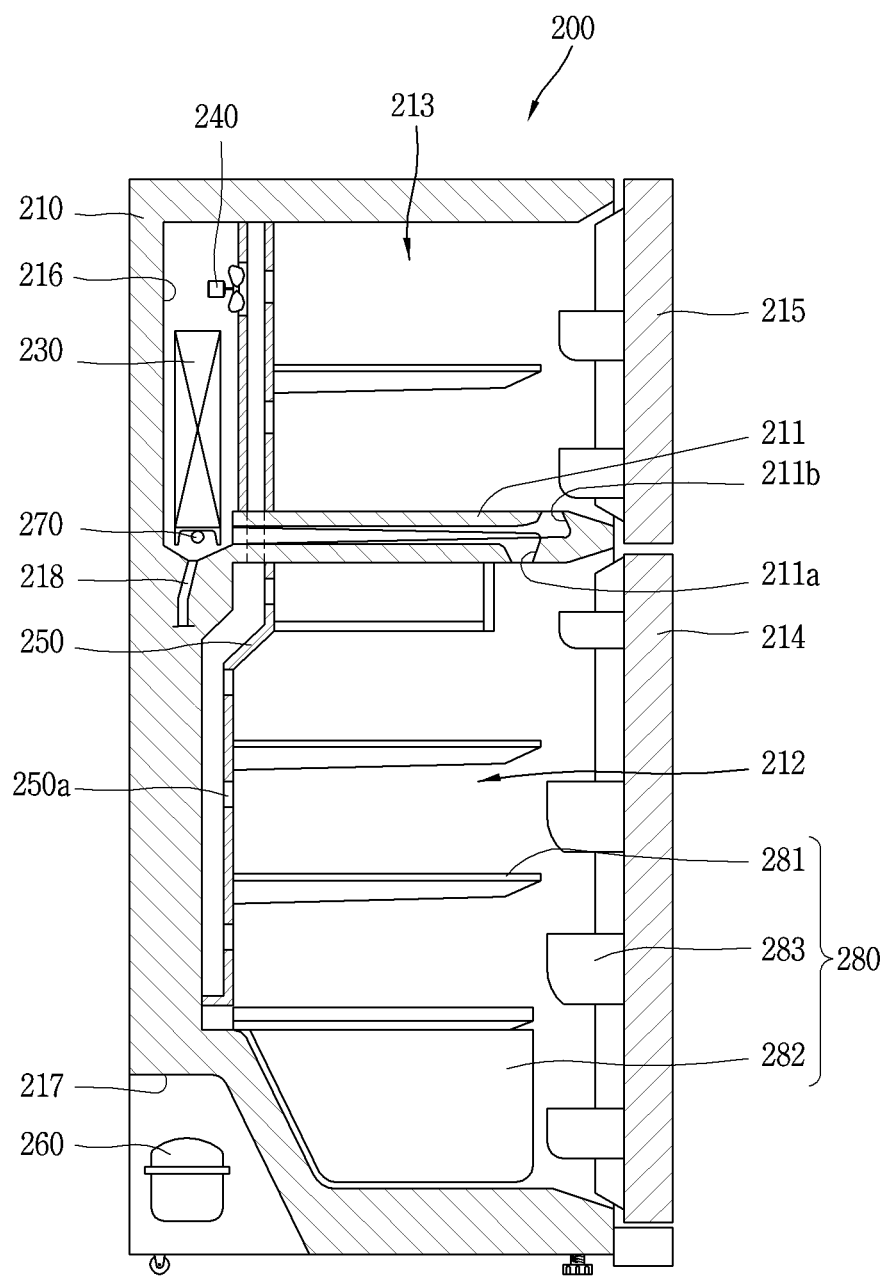
FIG. 4 is a longitudinal sectional view schematically illustrating a configuration of a refrigerator in accordance with one embodiment of the present disclosure.

FIG. 4 is a longitudinal sectional view schematically illustrating a configuration of a refrigerator 200 according to one embodiment of the present disclosure.

The refrigerator 200 is a machine for keeping foods stored therein at low temperature by using cold air generated by a refrigeration cycle in which processes of compression, condensation, expansion and evaporation are performed consecutively.

As illustrated, a refrigerator body 210 has a storage space for storing food therein. The storage space may be divided by a partition wall 211 and may be divided into a refrigerating chamber 212 and a freezing chamber 213 according to a set temperature.

In this embodiment, it is shown that the refrigerator is a top mount type in which the freezing chamber 213 is disposed on top of the refrigerating chamber 212, but the present disclosure is not limited thereto. The present disclosure may alternatively be applied to a side by side type refrigerator in which the refrigerating chamber and the freezing chamber are arranged left and right, a bottom freezer type refrigerator in which a refrigerating chamber is provided at an upper portion and a freezing chamber is provided at a lower portion thereof.

Doors are connected to the refrigerator body 210 to open and close the front opening of the refrigerator body 210. This drawing illustrates that a refrigerating chamber door 214 and a freezing chamber door 215 are configured to open and close front sides of the refrigerating chamber 212 and the freezing chamber 213, respectively. Doors may be variously configured, for example, as a rotatable door rotatably connected to the refrigerator body 210, a drawer-type door connected to the refrigerator body 210 to be slidably movable, and the like.

The refrigerator body 210 includes at least one storage unit 180 (e.g., a shelf 281, a tray 282, a basket 283, etc.) for efficient use of the internal storage space. For example, the shelf 281 and the tray 282 may be installed inside the refrigerator body 210, and the basket 283 may be installed on an inner side of the door 214 connected to the refrigerator body 210.

Meanwhile, a cooling chamber 216 provided with an evaporator 230 and a blowing fan 240 is provided at the rear side of the freezing chamber 213. The partition wall 211 is provided with a refrigerating chamber return duct 211a and a freezing chamber return duct 211b that allow air in the refrigerating chamber 212 and the freezing chamber 213 to be sucked and returned to the cooling chamber 216. In addition, a cold air duct 250 is provided at the rear side of the refrigerating chamber 212. The cold air duct 350 communicates with the freezing chamber 213 and has a plurality of cold air discharge ports 250a at the front side thereof.

A machine room 217 is provided in a lower rear side of the refrigerator body 210, and a compressor 260 and a condenser (not shown) are provided inside the machine room 217.

On the other hand, air in the refrigerating chamber 212 and the freezing chamber 213 is sucked into the cooling chamber 216 through the refrigerating chamber return duct 211a and the freezing chamber return duct 211b at the partition wall 211 by the blowing fan 240 in the cooling chamber 216 so as to perform heat exchange with the evaporator 230. The heat-exchanged air is then discharged to the refrigerating chamber 212 and the freezing chamber 213 through the cold air discharge ports 250a at the cold air duct 250. These processes are repeatedly performed. At this time, frost is formed on a surface of the evaporator 230 due to a temperature difference between air in the evaporator 330 and circulated air re-introduced through the refrigerating chamber return duct 211a and the freezing chamber return duct 211b.

In order to remove such frost, the evaporator 230 is provided with a defrosting apparatus 270, and water removed by the defrosting apparatus 270, that is, defrosted water, is collected in a defrosted water collector (not shown) positioned in a lower part of the refrigerator body 210 through a defrosted water discharge pipe 218.

Hereinafter, the defrosting apparatus 270 will be described in more detail.

Figure 5:
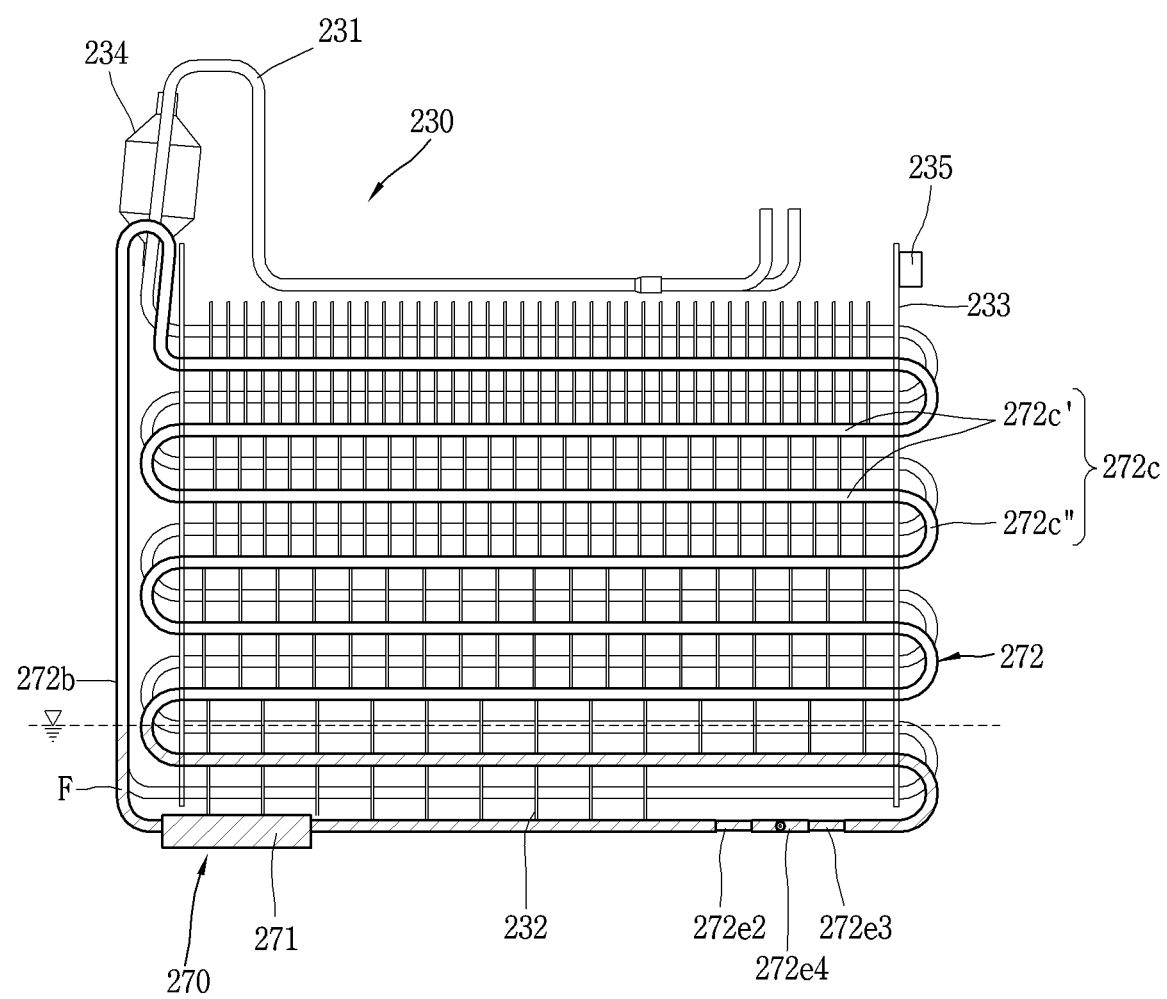
FIGS. 5 and 6 are a planar view and a perspective view illustrating one example of a defrosting apparatus applied to the refrigerator in FIG. 4.
Figure 6:
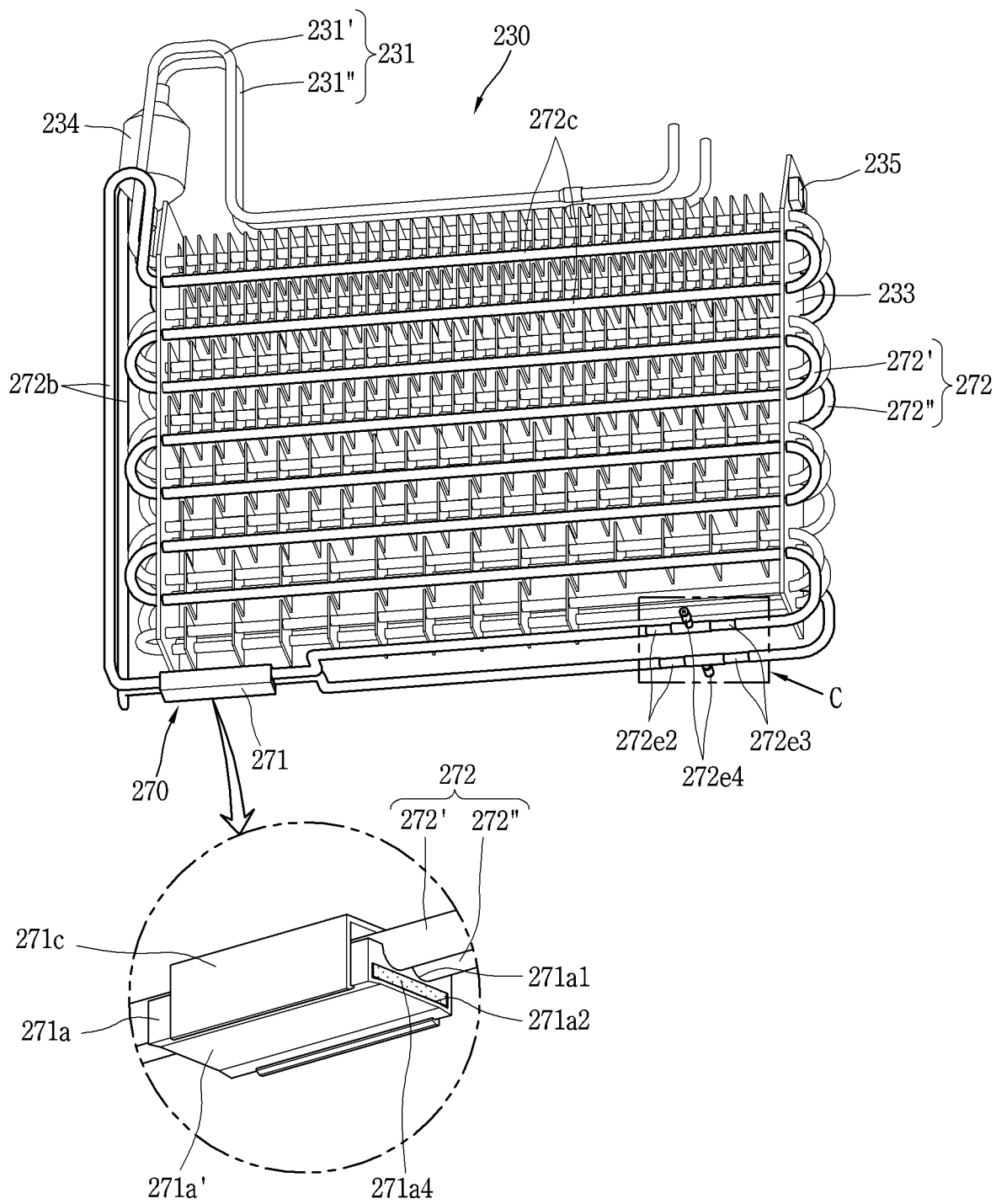

FIGS. 5 and 6 are a planar view and a perspective view illustrating one example of the defrosting apparatus 270 applied to the refrigerator 200 in FIG. 4.

Referring to FIGS. 5 and 6, the evaporator 230 includes a cooling pipe 231, a plurality of cooling pins 232, and supports 233.

The cooling pipe 231 is repeatedly bent in a zigzag form to form a plurality of steps or columns, and a refrigerant is filled therein. The cooling pipe 231 may be formed of aluminum.

The cooling pipe 231 may be configured by combination of horizontal pipe-lines and bending pipe-lines. The horizontal pipe-lines are arranged horizontally with each other in an up-down direction to form a plurality of columns, and the horizontal pipe-lines of each column are configured to penetrate through the cooling pins 232. The bending pipe-lines are configured to connect an end of an upper horizontal pipe-line and an end of a lower horizontal pipe-line, so that the upper and lower horizontal pipe-lines communicate with each other.

The cooling pipe 231 is supported by penetrating through the supports 233 provided at left and right sides of the evaporator 230, respectively. At this time, the bending pipe-line of the cooling pipe 231 is configured to connect the end of the upper horizontal pipe-line and the end of the lower horizontal pipe-line at the outer side of the support 233.

Referring to FIG. 6, in this embodiment, a first cooling pipe 231' and a second cooling pipe 231" are disposed at a front portion and a rear portion of the evaporator 230, respectively, to form two rows. For reference, in FIG. 5, the first cooling pipe 231' at the front and the second cooling pipe 231" at the rear are formed in the same shape, and therefore the second cooling pipe 231" is hidden by the first cooling pipe 231'.

However, the present disclosure is not limited thereto. The first cooling pipe 231' at the front and the second cooling pipe 231" at the rear may alternatively be formed in different shapes. On the other hand, the cooling pipe 231 may be formed in a single row.

In the cooling pipe 231, a plurality of cooling pins 232 is spaced apart from each other at a predetermined distance along an extending direction of the cooling pipe 231. The cooling pin 232 may be formed of a flat plate made of aluminum, and the cooling pipe 231 may be expanded in a state of being inserted into insertion holes of the cooling pins 232 to be firmly fitted into the insertion holes.

A plurality of supports 233 is provided at both the left and right sides of the evaporator 230, and each perpendicularly extends in an up-down direction to support the cooling pipe 231 inserted therethrough. The supports 233 each is provided with an insertion groove or an insertion hole through which the heat pipe 372 to be described later is fixedly inserted.

The defrosting apparatus 270 is installed at the evaporator 230 to remove frost generated at the evaporator 230. The defrosting apparatus 270 includes a heating unit 271 and a heat pipe 272 (heat-transfer pipe).

The heating unit 271 is disposed at a lower part of the evaporator 230, and is electrically connected to a controller (not shown) to generate heat when a driving signal is received from the controller.

The controller may be configured to apply a driving signal to the heating unit 271 at predetermined time intervals. For example, when a predetermined time elapses after the compressor 260 is turned on, the controller may turn off (OFF) the compressor 260 and turn on a power supply unit (not shown) to supply power to a heater 271b (see FIG. 7).

The control of the controller is not limited to such time control. The controller may also be configured to apply a driving signal to the heating unit 271 when a detected temperature of the cooling chamber 216 drops at or below the preset temperature.

The heat pipe 272 forms a circulation flow path of the working liquid F filled therein. In other words, the heat pipe 272 itself is in a shape of a closed loop. A part of the heat pipe 272 is configured to receive heat when the heater 271b is driven, and to be heated to a high temperature.

At least part of the heat pipe 272 is disposed to be adjacent to the cooling pipe 231 so that heat is dissipated to the cooling pipe 231 of the evaporator 230 from the working fluid F of high temperature heated and transferred from the heating unit 271. The working fluid F may be a refrigerant (for example, R-134a, R-600a, etc.) that exists in a liquid phase in a freezing condition of the refrigerator 200 but changes the liquid phase to a gas phase when heated so as to transfer heat.

The heat pipe 272 may include a first heat pipe 272' and a second heat pipe 272" disposed at the front and rear portions of the evaporator 230, respectively. In this embodiment, the first heat pipe 272' is disposed at the front of the first cooling pipe 231' and the second heat pipe 272" is disposed at the rear of the second cooling pipe 231", so as to form two rows.

The heat pipe 272 may be configured to be accommodated between the plurality of cooling pins 232 fixed to the respective columns of the cooling pipe 231. According to the above structure, the heat pipe 272 is arranged between the neighboring columns of the cooling pipe 231. In this case, the heat pipe 272 may also be configured to contact the cooling pins 232.

However, the present disclosure is not limited thereto. For example, the heat pipe 272 may be installed to penetrate through the plurality of cooling pins 232. That is, the heat pipe 272 may be expanded in the state of being inserted into the insertion holes of the cooling pins 232 to be firmly fitted into the insertion holes. According to the above structure, the heat pipe 272 is disposed to correspond to the cooling pipe 231.

Figure 7:
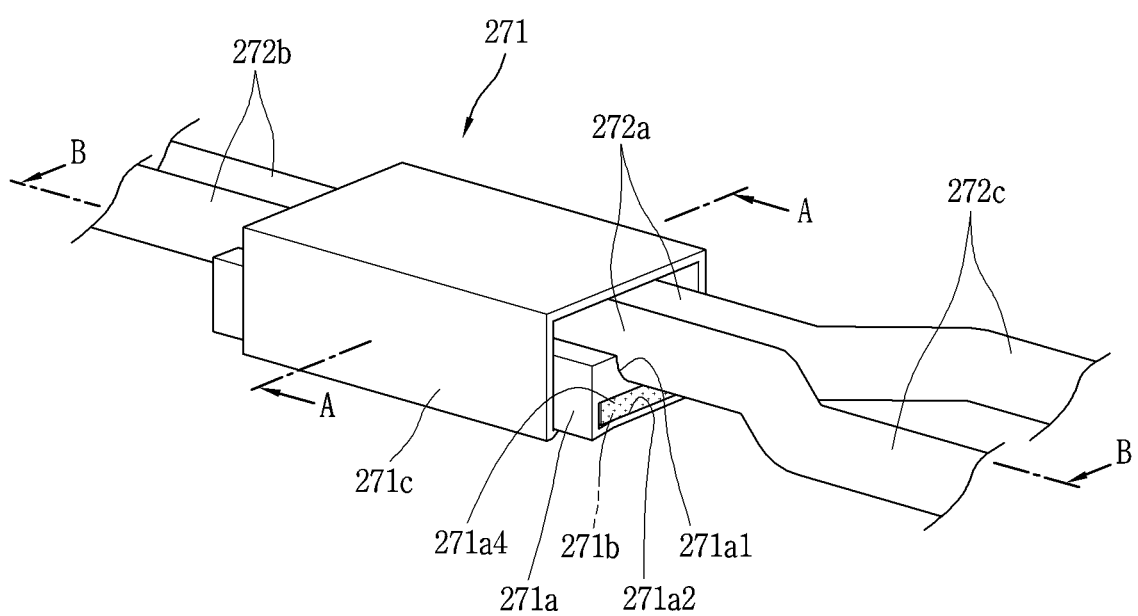
FIG. 7 is a perspective view illustrating a first embodiment of a heating unit illustrated in FIG. 6.
Figure 8:
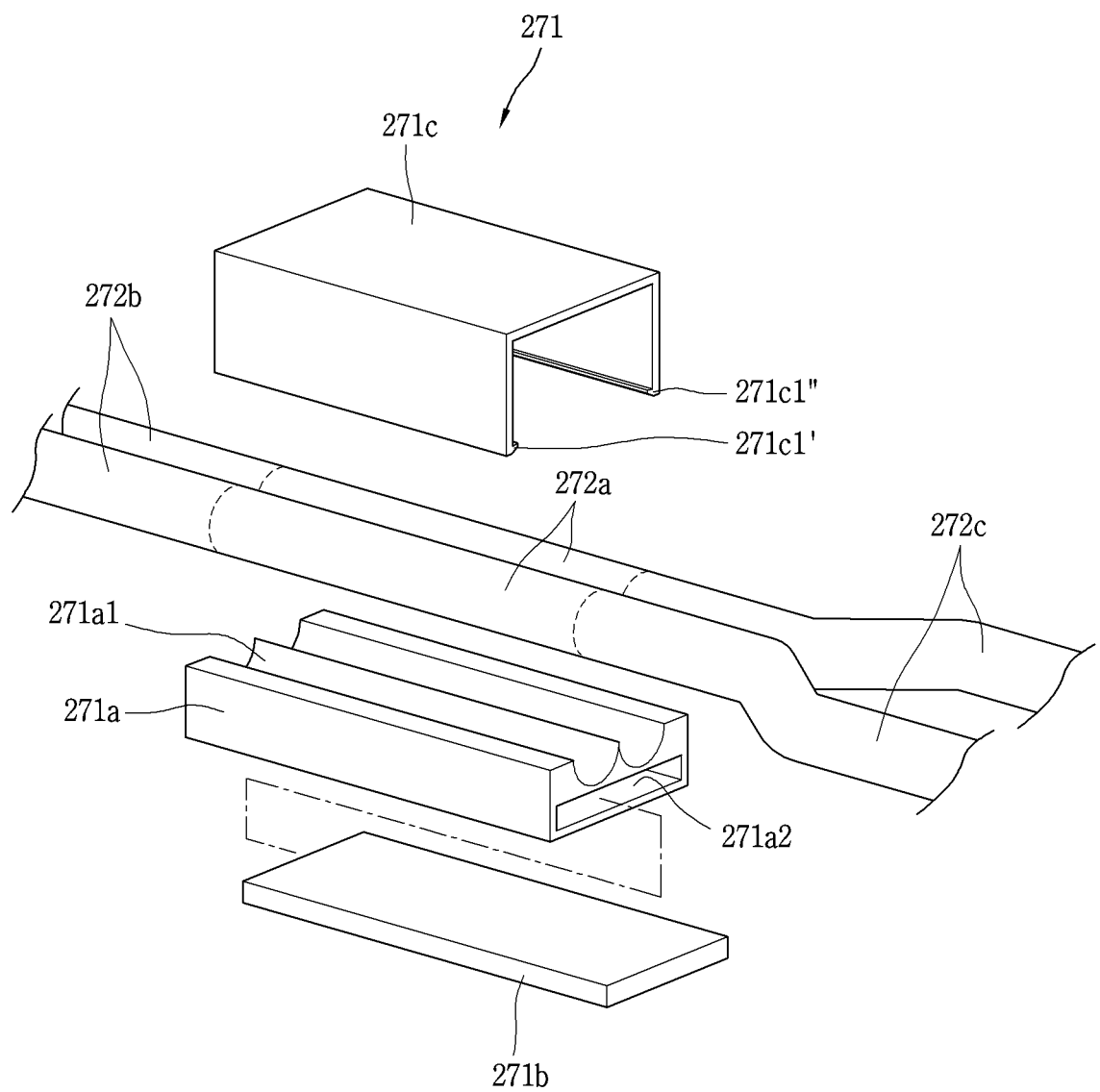
FIG. 8 is an exploded view illustrating a heating unit illustrated in FIG. 7.
Figure 9:
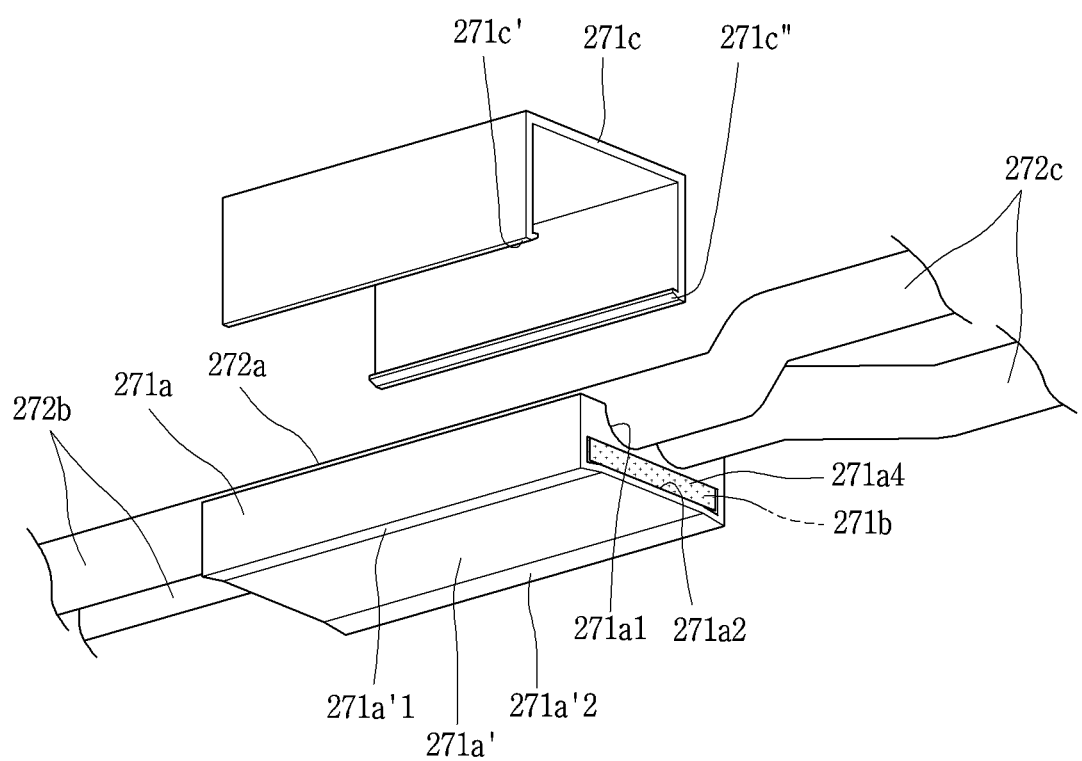
FIG. 9 is a perspective view of the heating unit illustrated in FIG. 7 viewed from the bottom.
Figure 10:
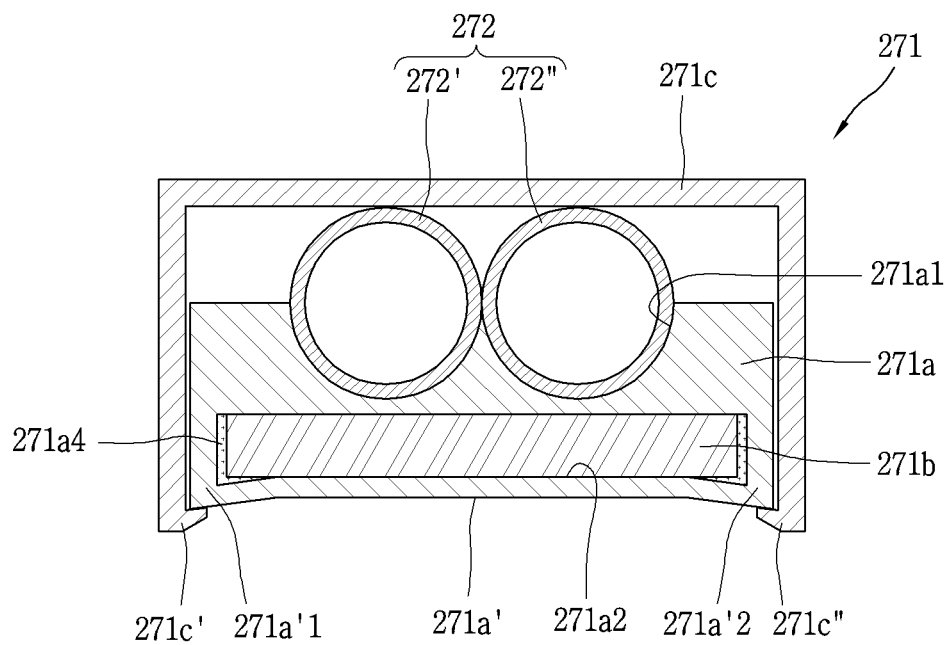
FIG. 10 is a sectional view illustrating a heater case illustrated in FIG. 7, taken along the line A-A.
Figure 11:
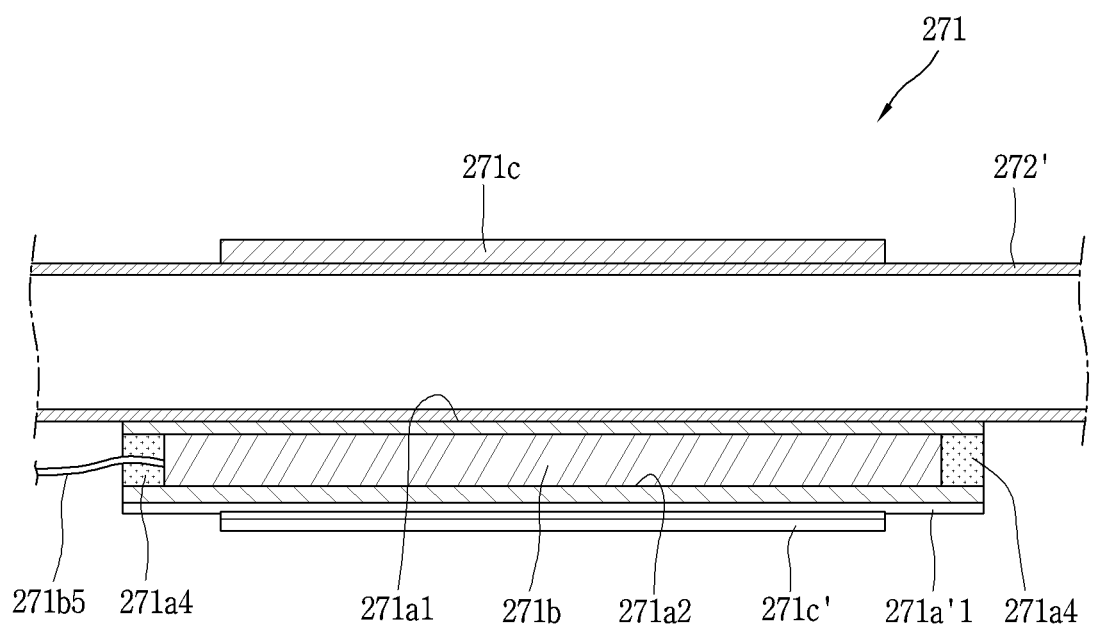
FIG. 11 is a sectional view illustrating the heating unit illustrated in FIG. 7, taken along the line B-B.

FIG. 7 is a perspective view illustrating a first embodiment of the heating unit illustrated in FIG. 6, FIG. 8 is an exploded view illustrating the heating unit 271 illustrated in FIG. 7, and FIG. 9 is a perspective view of the heating unit illustrated in FIG. 7 viewed from the bottom. In addition, FIG. 10 is a sectional view illustrating the heater case 271a illustrated in FIG. 7, taken along the line A-A, and FIG. 11 is a sectional view illustrating the heating unit 271 illustrated in FIG. 7, taken along the line B-B.

Regarding the heating unit 271 with reference to the drawings in detail, the heating unit 271 includes a heater case 271a, a heater 271b, and a holder 271c.

The heater case 271a may be formed to have appearance in a square pillar shape. In addition, the heater case 271a may be formed of a metal material (for example, aluminum).

The heater case 271a may be formed by extrusion molding. In this case, the heat pipe seating part 271a1 and the heater receiving part 271a2 5 to be described later are formed to extend in a direction of extrusion molding, that is, in the lengthwise direction of the heater case 271a.

The heater case 271a may be disposed at one side of the evaporator 230 at which an accumulator 234 is located, at another side opposite to the one side, or at any position between the one side and the another side.

The heater case 271a may be disposed to be adjacent to a lowest column of the cooling pipe 231. For example, the heater case 271a may be disposed at the same height as the lowest column of the cooling pipe 231 or at a position lower than the lowest column of the cooling pipe 231.

This embodiment shows that the heater case 271a is located at a position lower than the lowest column of the cooling pipe 231 at the one side of the evaporator 230 where the accumulator 234 is located, in a horizontal direction (that is, a left-right direction) to be in parallel with the cooling pipe 231.

The heater case 271a includes a heat pipe seating part 271a1 that provides a space in which a part of the heat pipe 272 can be seated. The heat pipe seating part 271a1 has a shape of recessed grooves at one side of the heater case 271a and extends along the lengthwise direction of the heater case 271a.

The heat pipe seating part 271a1 may have a shape corresponding to a part of the outer shape of the heat pipe 272 so that the heat pipe 272 can be seated at a specific position of the heater case 271a. The heat pipe 272 seated on the heat pipe seating part 271a1 may be configured to be in surface contact with the heat pipe seating part 271a1. Accordingly, more heat generated by the heater 271b is transferred to the working liquid F filled in the heat pipe 272, thereby improving the efficiency of the defrosting apparatus 270.

This drawing illustrates that the heat pipe seating part 271a1 is configured in a semi-circular shape in which the width gradually decreases from top to bottom so as to correspond to a part of the outer shape of the circular heat pipe 272. In this case, it is preferable that the heat pipe seating part 271a1 covers half or less of the circumferences of the heat pipe 272.

The heater case 271a may be formed by extrusion molding, and in this case, the heat pipe seating part 271a1 may be formed during the extrusion molding. In this case, the heat pipe seating part 271a1 extends along the extrusion direction of the heater case 271a, that is, the lengthwise direction (from one end to another end) of the heater case 271a. Also, in this case, the heat pipe seating parts 271a1 all have the same size along the lengthwise direction of the heater case 271a.

Alternatively, the heat pipe seating part 271a1 may also be configured by cutting one surface of the heater case 271a. In this case, the heat pipe seating part 271a1 may be extended to have a direction irrelevant to the extrusion molding direction of the heater case 271a. This may be a suitable structure when it is bent in the portion corresponding to the heat pipe seating part 271a1.

When the heat pipe 272 is configured by combination of (or provided with) first and second heat pipes 272' and 272" disposed at the front and rear portions of the evaporator 230, respectively, to form two rows, the heat pipe seating part 271a1 may be formed with two grooves corresponding to the first and second heat pipes 272' and 272". The two grooves may be arranged in parallel to each other.

The heat pipe 272 is disposed continuously in the heat pipe seating part 271a1. In other words, the heat pipe 272 is disposed to completely cover the heat pipe seating part 271a1.

The heater case 271a is provided with a heater receiving part 271a2 into which the heater 271b is inserted. The heater receiving part 271a2 extends in parallel with the heat pipe seating part 271a and is open at both ends of the heater case 271a. That is, the heater receiving part 271a2 is formed to penetrate through the heater case 271a. This drawing illustrates that the heater receiving part 271a2 is provided below the heat pipe seating part 271a.

As such, the structure in which the heater receiving part 271a2 in the shape of the insertion hole is formed in the heater case 271a has an advantage in that the heater 271b is easily mounted and a separate adhesive for attaching the heater to the heater case 271a is unnecessary.

The heater 271b for heating the working fluid F in the heat pipe 272 seated on the heat pipe seating part 271a1 is mounted in the heater receiving part 271a2. The heater 271b is configured to generate heat when power is supplied, and the working fluid F in the heat pipe 272 is heated to a high temperature by receiving the heat generated from the heater 271b.

The heater 271b may have a form extended along the extending direction of the heater receiving part 271a2. The heater 271b may have a shape of a flat plate having a predetermined thickness.

This embodiment shows that the heater receiving part 271a2 is configured below the heat pipe seating part 371a. In this way, the structure in which the heater 271b is disposed below the heater case 271a is advantageous for making the heated working fluid F have a thrust upward.

In a state where the heater 271b is inserted into the heater receiving part 271a2, one surface of the heater case 271a defining the heater receiving part 271a2 is pressed by a pressing member (not shown). The pressing is performed in a direction from the heater receiving part 271a2 toward the heat pipe seating part 271a1. By the pressing, a pressed portion 271a' recessed toward the heater receiving part 271a2 is formed in the heater case 271a.

The heater 271b is pressed by the pressed portion 271a' so as to be brought into close contact with an inner surface of the heater receiving part 271a2. In FIGS. 9 and 10, the pressed portion 271a' is formed on a bottom surface of the heater case 271a. The pressed portion 271a' has a recessed shape in a direction from a bottom surface of the heater case 371a to the heat pipe seating part 271a1. Therefore, the heater 271b is pressed by the pressed portion 271a', so as to be brought into close contact with an upper inner surface and a lower inner surface of the heater receiving part 271a2.

By the above structure, the heater 271b may be firmly fixed in the heater receiving part 271a2. In addition, since the heater 271b is closely adhered to the upper inner surface of the heater receiving part 371a2 that lies under the heat pipe seating part 271a1, more heat generated by the heater 271b may be transferred to the heat pipe seating part 271a1 and used to heat the working fluid F.

In a state where the heater 271b is mounted (accommodated and fixed) in the heater receiving part 271a2, a sealing member 271a4 may be filled in the heater receiving part 271a2 to seal the heater 271b. The sealing member 271a4 is filled in an empty space where the heater 271b is not disposed.

As shown, the sealing member 271a4 may be filled in gaps between the left and right inner surfaces of the heater receiving part 271a2 and left and right side surfaces of the heater 271b. In addition, the sealing member 271a4 may be disposed to cover the front and rear surfaces of the heater 271b.

Silicone, urethane, epoxy, or the like may be used as the sealing member 271a4. For example, after a liquid epoxy is filled in the empty space and then cured, the sealing structure of the heater 271b may be completed.

Turn-on and turn-off of the heater 271b may be controlled by a time condition, a temperature condition, and the like. For example, the heater 271b may be controlled to be turned on by the time condition, and may be controlled to be turned off by the temperature condition.

Specifically, the controller may turn off (OFF) the compressor 260 and supply power to the heater 271b when a predetermined time elapses after the compressor 260 constituting a refrigeration cycle with the evaporator 230 is turned on. Therefore, the heater 271b receives power and generates heat.

When the temperature sensed by the defrost sensor 235 reaches a preset defrost ending temperature, the controller may cut off power supplied to the heater 271b. Since no power is supplied to the heater 271b, active heating of the heater 271b stops, and the temperature gradually decreases.

The defrost sensor 235 is installed at a position suitable for representing the temperature of the evaporator 230. To this end, the defrost sensor 235 is preferably located in a portion less affected by the temperature rise by the defrosting apparatus 270.

In this embodiment, the defrost sensor 235 is mounted on an upper end portion of the support 233. When the heating unit 271 is disposed to be adjacent to one of the supports 233, the defrost sensor 235 may be mounted on the other support 233 farther from the heating unit 271.

Or, the defrost sensor 235 may be mounted at an inlet side of the cooling pipe 231. The inlet side of the cooling pipe 231 is a portion where the temperature is the lowest in the evaporator 230 and is less affected by the temperature rise by the defrosting apparatus 270. Thus, the inlet side is suitable as another position that represents the temperature of the evaporator 230.

When the temperature sensed by the defrost sensor 235 reaches a preset defrost ending temperature, the controller may cut off power supplied to the heater 271b. Since no power is supplied to the heater 271b, active heating of the heater 271b stops, and the temperature gradually decreases.

However, in the defrosting apparatus 270 of the present disclosure, the heater 271b having a characteristic of not generating heat any more as a current is suppressed due to a sharp increase in resistance at a preset temperature or higher may be used. That is, the heater 271b itself has a function of preventing its overheating. This will be described in detail later.

The holder 271c is detachably coupled to the heater case 271a to cover the heat pipe 272 seated on the heat pipe seating part 271a1. The holder 271c may be formed of a synthetic resin material or a metal material which may be elastically deformed to a predetermined level.

The holder 271c may be fixed to the heater case 271a in a hooking manner. To this end, first and second hooks 271c' and 271c" may be formed on both sides of the holder 271c. The heater case 271a may be provided with locking portions 271a1 and 271a'2 to which the first and second hooks 271c' and 271c" are engaged.

This drawing illustrates a structure that the holder 271c is disposed to cover the upper surface and both side surfaces of the heater case 271a, and the first and second hooks 271c' and 271c" of the holder 271c are hooked respectively to the locking portions 271a'1 and 271a'2 provided on the bottom surface of the heater case 271a.

Here, the locking portions 271a'1 and 271a'2 may be both edges of the heater case 271a which relatively protrudes than the pressed portion 271a' by the formation of the pressed portion 271a'.

The locking portions 271a'1 and 271a'2 may also be formed during extrusion molding of the heater case 271a. In this case, the locking portions 271a'1 and 271a'2 may be formed to extend in a direction of extrusion molding of the heater case 271a, that is, in the lengthwise direction of the heater case 271a.

For reference, the coupling between the heater case 271a and the holder 271c is not limited to the hook coupling.

For example, the heater case 271a and the holder 271c may be coupled to each other by coupling members. In this case, at least one coupling member may be provided at both sides of the heat pipe seating part 271a1, respectively.

In another example, one side of the holder 271c may be connected to the heater case 271a by a hinge, and another side of the holder 271c may be detachably coupled to the heater case 271a. Here, various coupling structures such as hook coupling, coupling using coupling members, and the like may be used in the coupling between the another side of the holder 271c and the heater case 271a.

As described above, the holder 271c is detachably coupled to the heater case 271a and has a structure to cover and fix the heat pipe 272 seated on the heat pipe seating part 271a1 when the holder 271c is coupled to the heater case 271a. Therefore, when a problem occurs in the heater 271b, since only the heater case 271a in which the heater 271b is mounted needs to be replaced by decoupling between the holder 271c and the heater case 271a, repair can be facilitated and the repair cost can be reduced.

The present disclosure has a structure that the heater 271b is inserted into the heater receiving part 271a2 and pressed and fixed therein, the heat pipe 272 is seated on the heater case 271a, and the holder 271c is coupled to the heater case 271a. Therefore damages to the heat pipe 272 during an assembly process can be prevented and the convenience of assembly can be improved.

On the other hand, as the working fluid F in the heat pipe 272 seated on the heat pipe seating part 271a1 is heated to a high temperature by the heater 271b, the working fluid F flows with directionality by a pressure difference.

Specifically, the working fluid F of high temperature heated by the heater 271b transfers heat to the cooling pipe 231 of the evaporator 230 while moving through the heat pipe 272. The working fluid F is gradually cooled by this heat exchange process. The cooled working fluid F is reheated by the heater 271b to repeat the above process. The cooling pipe 231 is defrosted by this circulation method.

Referring to FIGS. 5 and 6, at least a part of the heat pipe 272 is disposed to be adjacent to the cooling pipe 231 of the evaporator 230. Accordingly, heat is transferred to the cooling pipe 231 of the evaporator 230 from the working fluid F of high temperature which flows after being heated by the heating unit 271, thereby removing frost.

The heat pipe 272 may have a form (zigzag form) that is repeatedly bent like the cooling pipe 231. To this end, the heat pipe 272 includes a heating portion 272a, an extending portion 272b, and a heat dissipating portion 272c.

The heating portion 272a is a portion positioned on the heat pipe seating part 271a1 which receives heat through the heater case 271a when the heater 271b is driven. At least a part of the heating portion 272a overlaps the heater 271b in a thickness direction of the heater case 271a.

When the heater 271b is driven, the working liquid F in the heating portion 272a is heated to a high temperature. A thrust for circulation flow is generated in the working fluid F, as the working fluid F is heated to a high temperature.

The heating portion 272a may be surrounded by the heater case 271a and the holder 271c. That is, the heating portion 272a is located in the heating unit 271.

The extending portion 272b forms a flow path for transferring the working fluid F heated by the heating portion 272a to the upper side of the evaporator 230. This drawing illustrates that the heating portion 272a is provided in the lower part of the evaporator 230, and the extending portion 272b is extended toward the upper part of the evaporator 230 in the front end part of the heating portion 272a.

The extending portion 272b extends up to the upper part of the evaporator 230 with being spaced apart from the support 233, at the outside of the support 233 which is provided at one side of the evaporator 230. The extending portion 272b may further include a horizontally extending part depending on the position of the heating portion 272a, that is, the installation position of the heating unit 271. For example, when the heating unit 271 is provided at a position spaced apart from the support 233, a portion extending horizontally may be further provided to extend the heating unit 271 to the outside of the support 233.

When a portion extending horizontally to the heating unit 271 extends long, the working fluid F of high temperature passes through the lower part of the evaporator 230. Therefore, the cooling pipe 231 disposed at the lower part of the evaporator 230 can be defrosted smoothly.

The heat dissipating portion 272c is connected to the extending portion 272b extending to the upper part of the evaporator 230 and extends in a zigzag form along the cooling pipe 231 of the evaporator 230. The heat dissipating portion 272c is configured by a combination of a plurality of horizontal pipes 272c' (see FIG. 12) forming columns in an up-down direction, and connection pipes 272c'' formed in a U-shape that is bent to connect the horizontal pipes 372b' in a zigzag form.

The extending portion 272b or the heat dissipating portion 272c may extend up to a position adjacent to the accumulator 234 to remove frost accumulated on the accumulator 234.

As illustrated, when the extending portion 272b is disposed at one side of the evaporator 230 where the accumulator 234 is located at, the extending portion 272b may extend upwards to a position adjacent to the accumulator 234, and be bent downwards to the cooling pipe 231, then extend to be connected to the heat dissipating portion 272c.

On the other hand, when the extending portion 272b is disposed at the another side that is opposite to the one side of the evaporator 230, the heat dissipating portion 272c may be connected to the extending portion 272b, extended horizontally, and extend upwards to the accumulator 234, then extend downwards to correspond to the cooling pipe 231.

Based on the flow direction of the working fluid F, the working fluid F of high temperature flows into the heat pipe 272 located at the front of the heating portion 272a, and the cooled working liquid F is collected back to the heat pipe 272 located at the rear of the heating portion 272a. In this embodiment, a circulation flow path for the working fluid F is formed such that the working fluid F heated by the heater 271b is transferred to the upper part of the evaporator 230 through the extending portion 272b, transfers heat to the cooling pipe 231 while flowing along the heat dissipating portion 272c so as to perform defrosting, is returned to the heating portion 272a, and then is reheated by the heater 271b so as to flow along the heat pipe 272.

For reference, the heat pipe 272 is configured by the first and second heat pipes 272' and 272'' forming two rows in this embodiment, but the present disclosure is not limited thereto. The heat pipe 272 may alternatively be formed in a single row.

Figure 12:
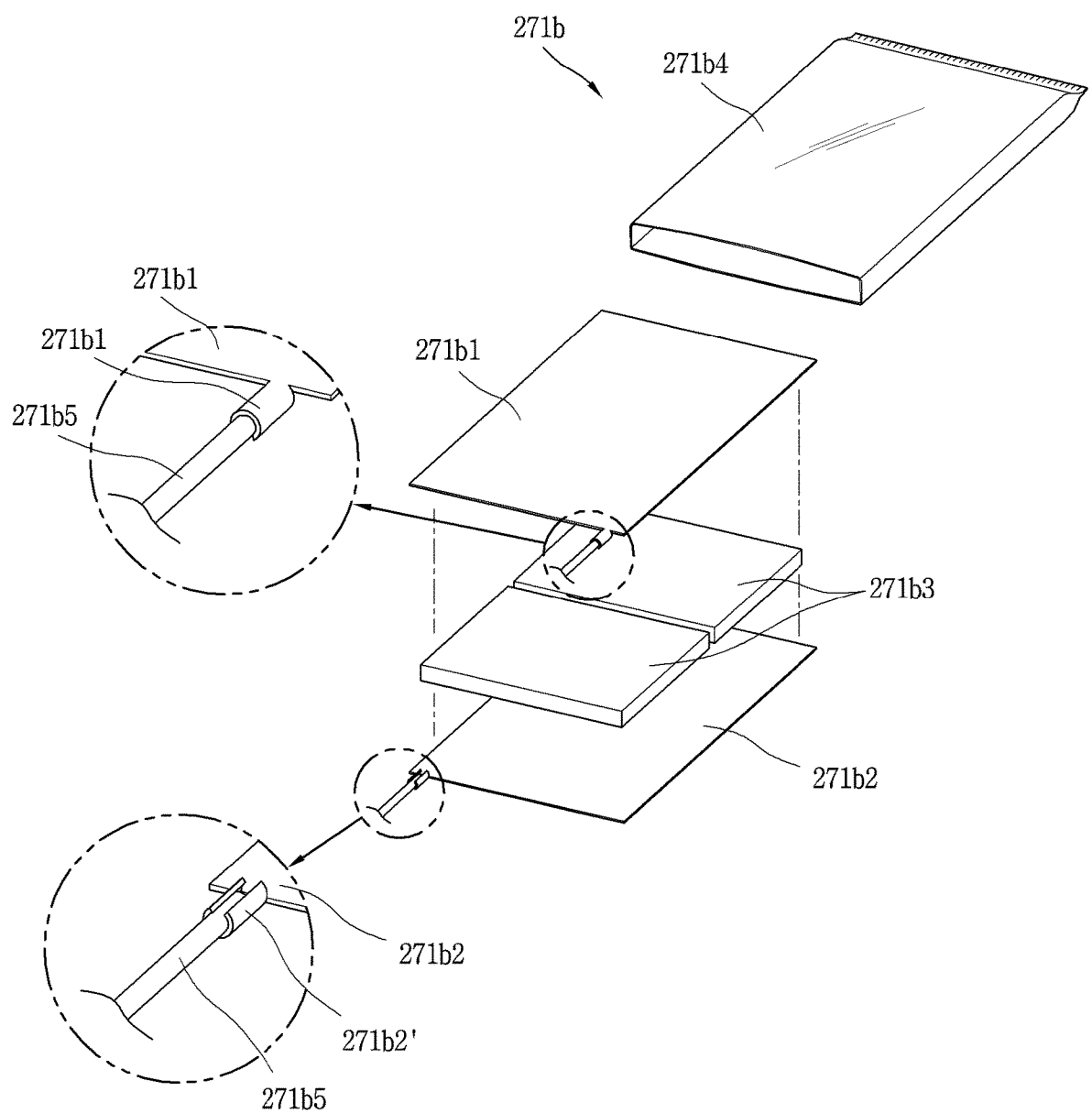
FIG. 12 is an exploded perspective view illustrating one example of a heater illustrated in FIG. 7.

FIG. 12 is an exploded perspective view illustrating one example of the heater illustrated in FIG. 7.

As described above, the heater 271b does not generate heat any more at a preset temperature or higher because a current is suppressed due to a sharp increase in resistance. For example, in order to ensure the safety of the defrosting apparatus 270, the heater 271b may be configured to no longer generate heat when it reaches 280° C.

As such, the heater 271b has a limited temperature of heat to be generated by its own characteristic. Therefore, there is an advantage in that the safety of the heater 271b can be secured without using a fuse or a bimetal switch as a safety device.

Referring to FIG. 12, the heater 271b may include first and second electrode plates 271b1 and 271b2, and a Positive Temperature Coefficient (PTC) thermistor 271b3.

The first and second electrode plates 271b1 and 271b2 are disposed to face each other at a predetermined interval. The first and second electrode plates 271b1 and 271b2 are formed of a metal material (for example, aluminum material).

Each of the first and second electrode plates 271b1 and 271b2 is electrically connected to a power supply unit (not shown) through a lead wire 271b5. In order to connect the lead wire 271b5 to the first and second electrode plates 271b1 and 271b2, the first and second electrode plates 271b1 and 271b2 may be provided with clamping parts 271b1' and 271b2', respectively, which surround and fix the lead wires 271b5.

The PTC thermistor 271b3 is interposed between the first electrode plate 271b1 and the second electrode plate 271b2. The PTC thermistor 271b3 has a characteristic that resistance increases as temperature rises. The PTC thermistor 271b3 is formed of barium titanate-based ceramics obtained by mixing a small amount (0.1% to 1.5%) of oxides such as lanthanum, yttrium, bismuth, and thorium with barium titanate and plasticizing the mixture.

The PTC thermistor 271b3 has a relatively small resistance value at a low temperature, but has a characteristic of drastic increase in resistance when it reaches a predetermined temperature. Therefore, current is suppressed at or above the predetermined temperature.

The temperature at which the temperature-resistance characteristic of the PTC thermistor 271b3 changes rapidly is called Curie Point or Curie Temperature. The Curie point may be moved to a high temperature side or to a low temperature side by controlling components of the PTC thermistor 271b3. Therefore, the heater 271b that generates sufficient heat for defrosting but is restricted from generating heat at the predetermined temperature or higher can be manufactured by adjusting the components of the PTC thermistor 271b3.

The method of adjusting the Curie point is as follows. When part of barium is replaced with lead, the Curie point moves toward higher temperature. When barium is replaced with strontium or part of titanium is replaced with tin or zirconium, the Curie point moves toward lower temperature. In this manner, the PTC thermistor 271b3 having a heat generation characteristic suitable for use as a defrost heater 271b may be manufactured.

The PTC thermistor 271b3 may be provided in plurality. For example, as illustrated, two PTC thermistors 271b3 of ×W (watts) may be disposed along one direction to form a 2×W (watts) heater 271b.

The PTC thermistor 271b3 is tightly attached to the first and second electrode plates 271b1 and 271b2, respectively. A resistance paste (for example, Ag paste) may be applied to both surfaces of the PTC thermistor 271b3 contacting the first and the second electrode plates 271b1 and 271b2, respectively.

On the other hand, the heater 271b may further include an insulating film 271b4 formed to surround the first and second electrode plates 271b1 and 271b2. As illustrated, the insulating film 271b4 may be configured to accommodate the first and second electrode plates 271b1 and 271b2 having the PTC thermistor 271b3 interposed therebetween.

Hereinafter, the characteristics of the PTC thermistor 271b3 will be described in more detail.

Figure 13:
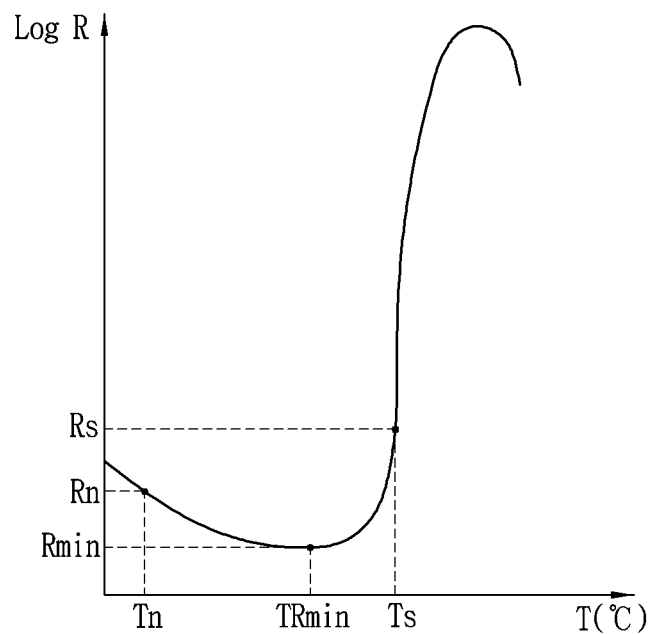
FIG. 13 is a graph showing a resistance-temperature characteristic of a PTC thermistor illustrated in FIG. 12.

FIG. 13 is a graph showing the resistance-temperature characteristics of the PTC thermistor 271b3 shown in FIG. 12.

When the resistance according to the temperature change of the PTC thermistor 271b3 is measured, the resistance-temperature characteristic as shown in FIG. 13 is obtained. The PTC thermistor 271b3 shows a characteristic of a sudden increase in resistance when reached to the Curie point.

The Curie point at which the temperature-resistance characteristic of the PTC thermistor 271b3 changes abruptly is generally defined as a temperature corresponding to twice the minimum resistance value Rmin or a temperature corresponding to twice the resistance value Rn at a reference temperature (Tn, room temperature, 25° C.).

In the graph, Tmin is a temperature for the minimum resistance value Rmin, Ts is the Curie point (switching temperature) at which the resistance value increases rapidly, and Rs is the resistance value at the Curie point.

Figure 14:
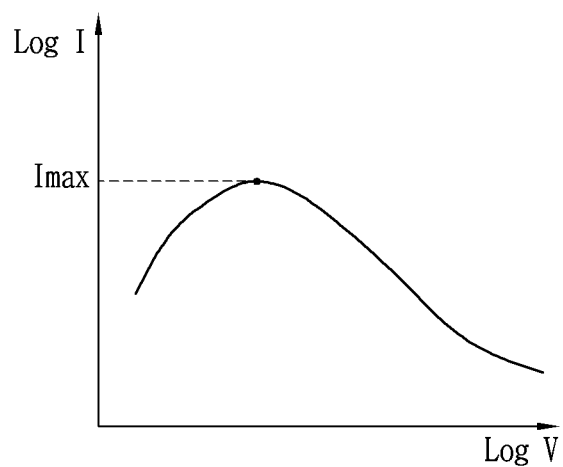
FIG. 14 is a graph showing a current-voltage characteristic of the PTC thermistor illustrated in FIG. 12.

FIG. 14 is a graph showing the current-voltage characteristics of the PTC thermistor 271b3 illustrated in FIG. 12.

When voltage is gradually increased by applying it to the PTC thermistor 271b3, the temperature of the PTC thermistor 371b3 rises due to self-heating as shown in FIG. 14. When the temperature rises above the Curie point, the resistance increases due to the resistance-temperature characteristic described above, and thus the current decreases. By using this characteristic, the PTC thermistor 271b3 may be used as the heater 271b having a constant temperature heating function and an overcurrent protection function.

When viewing the voltage and the current on a log scale, an electrostatic characteristic is shown at a part where the current decreases. This characteristic has an advantage that the PTC thermistor 271b3 does not require a separate control circuit.

Due to the characteristic of the PTC thermistor 271b3 described above, the PTC thermistor 271b3 stays in a low resistance region during normal operation and serves as a general fixed resistance, but after it exceeds the Curie point by self-heating, the current is suppressed and any more overheating is prevented. Therefore, problems such as shortening of the life of the heater due to overheating and deterioration of the efficiency of the evaporator can be solved. In addition, unlike a fuse in which an internal configuration melts down when temperature exceeds a preset temperature and does not function any more, the heater 271b using the PTC thermistor 271b has a characteristic of preventing overheating itself, it is advantageous in terms of maintenance of the defrosting apparatus 270.

Figure 15:
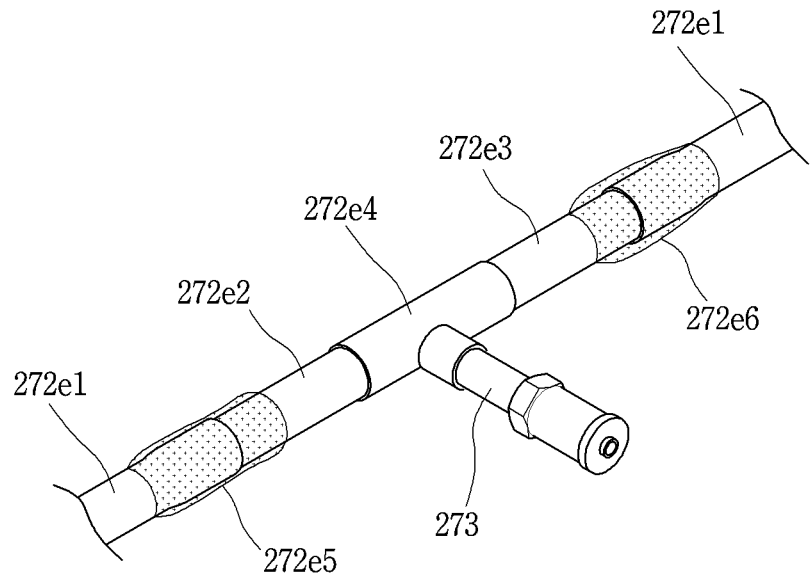
FIG. 15 is an enlarged view illustrating a part C illustrated in FIG. 6.
Figure 16:
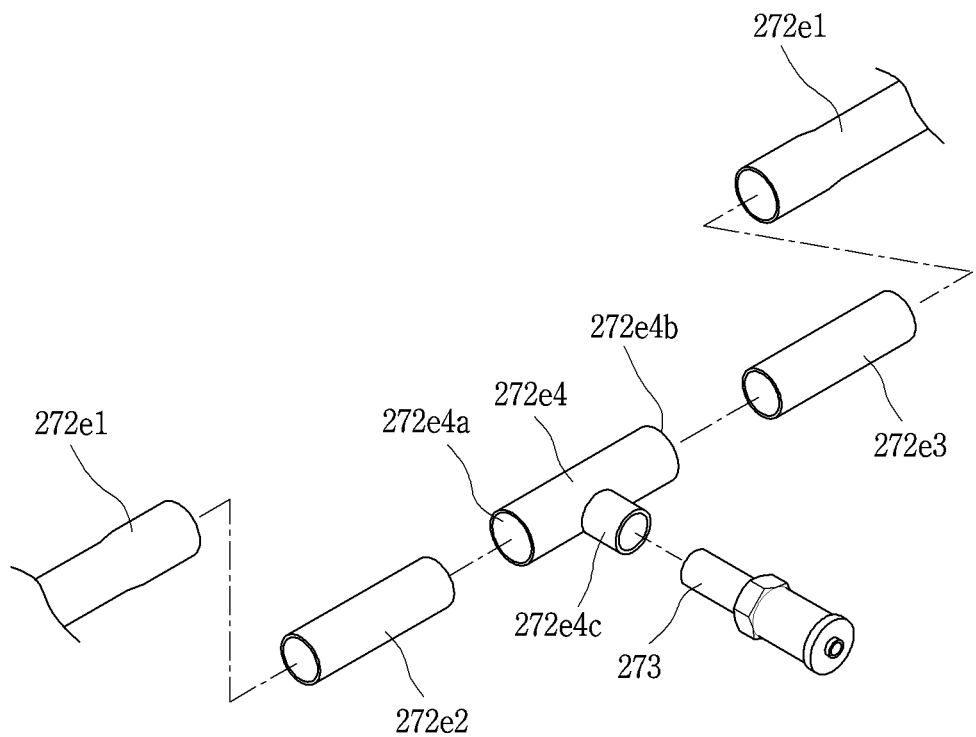
FIG. 16 is an exploded view of the heat pipe illustrated in FIG. 15.

FIG. 15 is an enlarged view of a portion C illustrated in FIG. 6, and FIG. 16 is an exploded view of the heat pipe 272 illustrated in FIG. 15.

As described above, in the prior patent structure of the company to which this disclosure pertains, the working fluid injection pipe 173 is welded to the heater case 171a. Here, the working fluid injection pipe 173 was not only made of copper in which the material was different from the heater case 171a made of aluminum, but also was welded in a state perpendicular to the heater case 171a, so that welding was difficult and there was a possibility of slag being introduced into the inner flow path 171a1.

In order to solve such a problem, the present disclosure discloses the following new working fluid injection structure.

Referring to FIGS. 15 and 16, the heat pipe 272 includes a main pipe 272e1, a first connection pipe 272e2, a second connection pipe 272e3, and a joint pipe 272e4.

The main pipe 272e1 occupies most of the heat pipe 272 and is formed of a first material (for example, aluminum). The main pipe 272e1 is repeatedly bent in a zigzag form to configure a plurality of steps or columns, and is disposed adjacent to the cooling pipe 231.

The first connection pipe 272e2 is formed of a second material (e.g., copper) and is continuously connected to one end portion of the main pipe 272e1 by welding. Here, the term "continuously" means that the first connection pipe 272e2 is connected to one end portion of the main pipe 272e1 in a straight line. That is, the first connection pipe 272e2 is arranged to correspond to the extending direction of the one end portion of the main pipe 272e1. In addition, the first connection pipe 272e2 is horizontally welded to the one end portion of the main pipe 272e1 by the arrangement.

The second connection pipe 272e3 is formed of a second material (e.g., copper) and is continuously connected to another end portion of the main pipe 272e1 by welding. Here, the term "continuously" means that the second connection pipe 272e3 is connected to the another end portion of the main pipe 272e3 in a straight line. That is, the second connection pipe 272e3 is arranged to correspond to the extending direction of the another end portion of the main pipe 272e1. In addition, the second connection pipe 272e3 is horizontally welded to the another end portion of the main pipe 272e1 by the arrangement.

The first and second connection pipes 272e2 and 272e3 may be configured to have the same outer diameter as the main pipe 272e1.

Alternatively, the outer diameters of the first and second connection pipes 272e2 and 272e3 may also be set smaller than the inner diameter of the main pipe 272e1, so that parts of the first and second connection pipes 272e2 and 272e3 are inserted into the main pipe 272e1, respectively.

On the contrary, the outer diameter of the main pipe 272e1 may also be set smaller than the inner diameters of the first and second connection pipes 272e2 and 272e3, so that a part of the main pipe 272e1 is inserted into the first and second connection pipes 272e2 and 272e3.

A first adhesive portion 272e5 may be applied to cover a welded portion, after welding between the main pipe 272e1 and the first connection pipe 272e2 is completed. Similarly, a second adhesive portion 272e6 may be applied to cover a welded portion, after welding between the main pipe 272e1 and the second connection pipe 272e3 is completed. The first and second adhesive portions 272e5 and 272e6 may be formed of an epoxy material.

The joint pipe 272e4 is formed of a second material (for example, copper), and has a first connection portion 272e4a connected to the first connection pipe 272e2, a second connection portion 272e4b connected to the second connection pipe 272e3, and a working fluid injection portion 272e4c in communication with the first and second connection portions 272e4a and 272e4b.

That is, the joint pipe 272e4 is interposed between the first connection pipe 272e2 and the second connection pipe 272e3 to communicate the first and second connection pipes 272e2 and 272e3, so that the working fluid F can be injected into the communicated pipes.

The first connection portion 272e4a and the second connection portion 272e4b may be disposed to face each other.

Accordingly, the one end portion of the main pipe 272e1, the first connection pipe 272e2, the first connection portion 272e4a, the second connection portion 272e4b, the second connection pipe 272e3, and the another end portion of the main pipe 272e1 are arranged in order along one direction.

The working fluid injection portion 272e4c is configured to intersect with the first connection portion 272e4a and the second connection portion 272e4b, respectively. This drawing illustrates that the working fluid injection portion 272e4c protrudes in a direction perpendicular to the first and second connection portions 272e4a and 272e4b. Accordingly, the joint pipe 272e4 is configured in a T-like shape.

The outer diameter of the first connection pipe 272e2 may be set smaller than the inner diameter of the first connection portion 272e4a so that a part of the first connection pipe 272e2 is inserted into the first connection portion 272e4a. On the contrary, the outer diameter of the first connection portion 272e4a may be set smaller than the inner diameter of the first connection pipe 272e2 so that a part of the first connection portion 272e4a is inserted into the first connection pipe 272e2.

Similarly, the outer diameter of the second connection pipe 272e3 may be set smaller than the inner diameter of the second connection portion 272e4b so that a part of the second connection pipe 272e3 is inserted into the second connection portion 272e4b. On the contrary, the outer diameter of the second connection portion 272e4b may be set smaller than the inner diameter of the second connection pipe 272e3 so that a part of the second connection portion 272e4b is inserted into the second connection pipe 272e3.

The first connection pipe 272e2 and the first connection portion 272e4a may be interconnected by welding. In this case, since the first connection pipe 272e2 and the first connection portion 272e4a are not only the same material but also connected in a straight line and are horizontally welded, the first connection pipe 272e2 and the first connection portion 272e4a can be easily welded, and the defect rate to the welding of heterogeneous materials can be reduced.

The first connection pipe 272e2 and the first connection portion 272e4a may be fastened by a screw method, or more firmly connected by welding after being fastened by a screw method.

The second connection pipe 272e3 and the second connection portion 272e4b are interconnected by welding. In this case, since the second connection pipe 272e3 and the second connection portion 272e4b are not only formed of the same material but also connected in a straight line and are horizontally welded, the second connection pipe 272e3 and the second connection portion 272e4b can be easily welded, and the defect rate to the welding of heterogeneous materials can be reduced.

The second connection pipe 272e3 and the second connection portion 272e4b may be fastened by a screw method, or more firmly connected by welding after being fastened by a screw method.

Welding direction between the main pipe 272e1 and the first connection pipe 272e2, welding direction between the first connection pipe 272e2 and the first connection portion 272e4a, welding direction between the second connection portion 272e4b and the second connection pipe 272e3, and welding direction between the second connection pipe 272e3 and the main pipe 272e1 may correspond to each other. That is, they can all be horizontally welded.

A working fluid injection pipe 273 of a second material (for example, copper) is connected to the working fluid injection portion 272e4c. The outer diameter of the working fluid injection pipe 273 may be set smaller than the inner diameter of the working fluid injection portion 272e4c so that a part of the working fluid injection pipe 273 can be inserted into the working fluid injection portion 272e4c. On the contrary, the outer diameter of the working fluid injection portion 272e4c may be set smaller than the inner diameter of the working fluid injection pipe 273 so that a part of the working fluid injection portion 272e4c can be inserted into the working fluid injection pipe 273.

The working fluid injection pipe 273 and the working fluid injection portion 272e4c may be interconnected by welding. In this case, since the working fluid injection pipe 273 and the working fluid injection portion 272e4c are not only the same material but also connected in a straight line and are horizontally welded, the working fluid injection pipe 273 and the working fluid injection portion 272e4c can be easily welded, and the defect rate to the welding of heterogeneous material can be reduced.

The working fluid injection pipe 273 and the working fluid injection portion 272e4c may be fastened by a screw method, or more firmly connected by welding after being fastened by a screw method.

The working fluid F is injected into the joint pipe 272e4 through the working fluid injection pipe 273 to fill by a predetermined amount in the heat pipe 272. After the working fluid F is filled through the working fluid injection pipe 273, the working fluid injection pipe 273 is sealed.

According to the above structure, unlike the related art structure in which the fluid injection pipe 173 made of copper is inserted into the working fluid injection portion 171a3 formed at the heater case 171a made of aluminum and vertically welded, the working fluid injection pipe 273 made of copper is inserted into the joint pipe 272e4 made of copper and horizontally welded, therefore they can be easily welded, and the defect rate to the welding of heterogeneous materials can be reduced.

On the other hand, as described above, the heat pipe 272 is repeatedly bent in a zigzag form to configure a plurality of columns, and arranged in a row with the cooling pipe 231 front and back. The heat pipe 272 may be installed to be accommodated between a plurality of cooling pins 232 fixed to the respective columns of the cooling pipe 231 or to penetrate through the plurality of cooling pins 232.

As such, the cooling pipe 231 and the cooling pins 232 are disposed adjacent to the heat pipe 272. Therefore, in order to avoid interference with the cooling pipe 231 and the cooling pins 232, the working fluid injection portion 272e4c of the joint pipe 272e4 is preferably disposed to protrude toward the front or rear of the evaporator 230.

This drawing illustrates that the above-described working fluid injection structure is disposed at the lowest column of the heat pipe 272. Cooling pins 232 may not be disposed at portions where the working fluid injection structure is located.

A first heat pipe 272' and a second heat pipe 272" form mutually independent flow paths when the heat pipe 272 is configured by combination of the first heat pipe 272' and the second heat pipe 272" disposed respectively at front and rear of the evaporator 230. That is, the working fluid F flowing through each of the first heat pipe 272' and the second heat pipe 272" does not mix with each other.

Therefore, the above-mentioned working fluid injection structure should be provided in each of the first heat pipe 272' and the second heat pipe 272". In this case, in order to avoid interference with the cooling pipe 231 and the cooling pins 232, it is preferable that the working fluid injection portion 272e4c provided at the first heat pipe 272' is disposed to protrude toward the front and the working fluid injection portion 272e4c provided at the second heat pipe 272" is disposed to protrude toward the rear.

Figure 17:
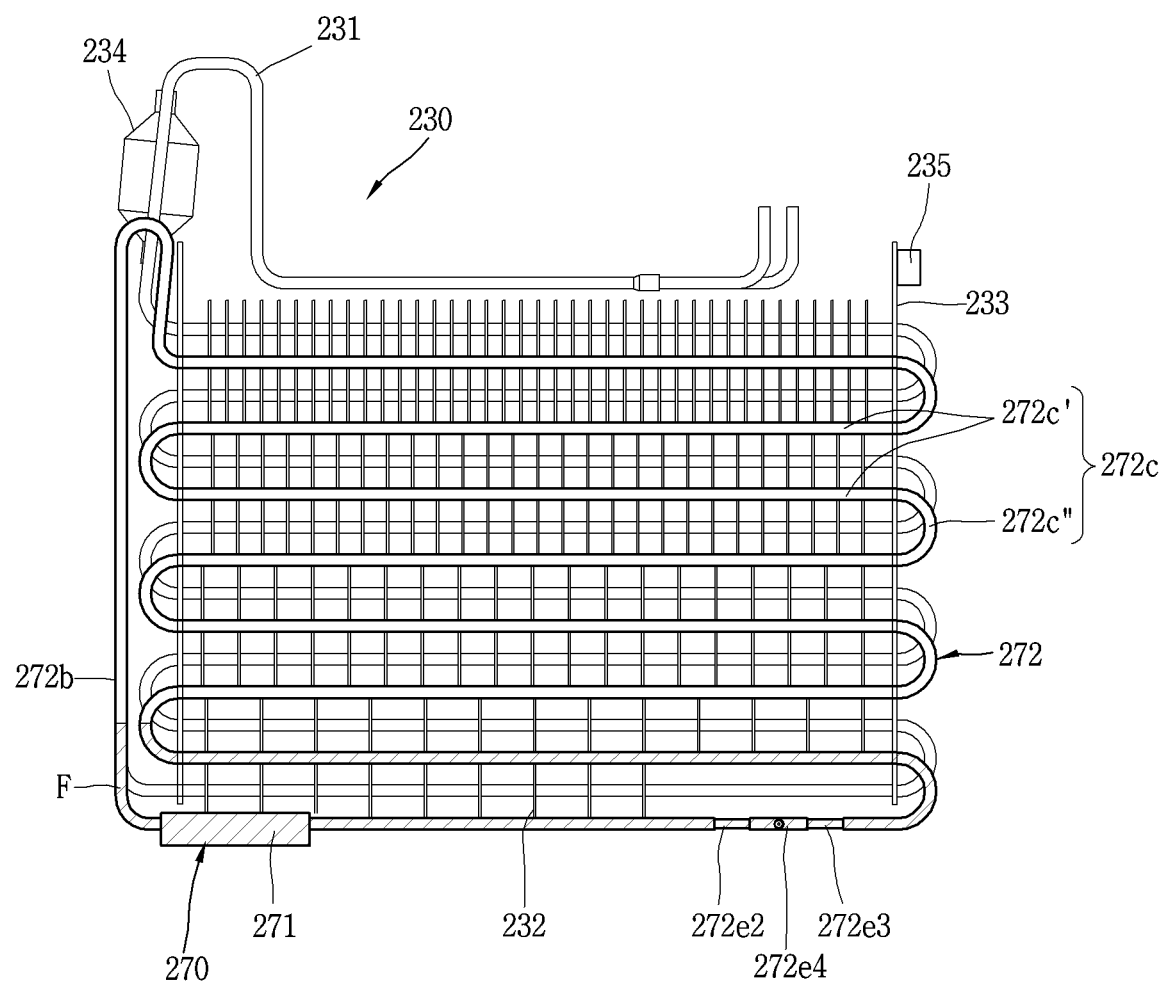
FIGS. 17 and 18 are conceptual views illustrating a circulation of a working fluid in states before and after an operation of a heater.
Figure 18:
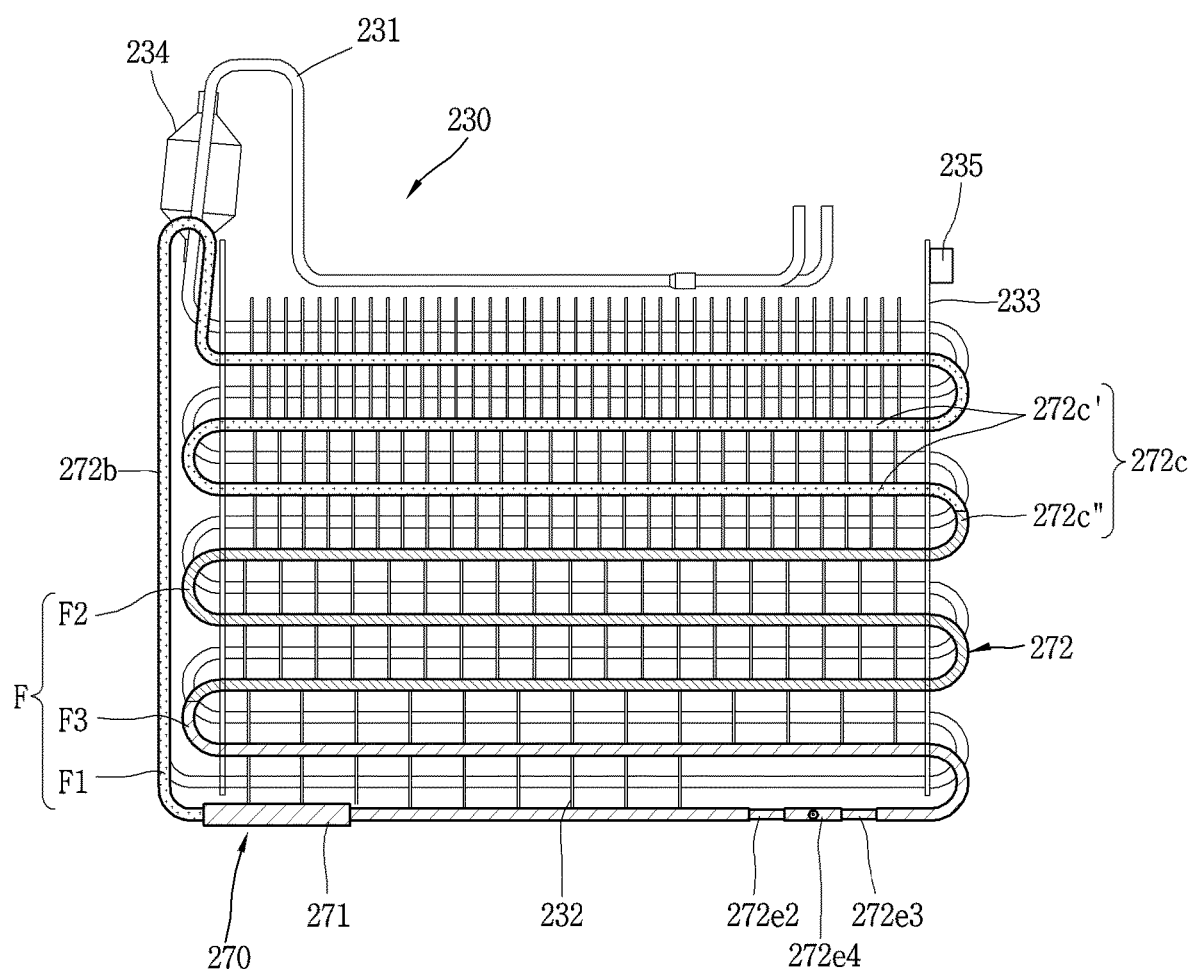

FIGS. 17 and 18 are conceptual views illustrating the circulation of the working fluid F in states before and after the operation of the heater 271b.

First, referring to FIG. 17, the working fluid F is in a liquid state before the heater 271b operates, and is filled up by a predetermined column of upper part of the heat pipe 272 based on the lowermost column of the heat pipe 272. As an example, in this state, the working fluid F may be filled up to the second column of the lower part of the heat pipe 272.

When the heater 271b operates, the working fluid F in the heat pipe 272 is heated by the heater 271b. Referring to FIG. 18, the working fluid F heated to a high-temperature gas state F1 in the heating portion 272a (see FIG. 8) is moved to the upper part of the evaporator 230 through the extending portion 272b, and the heat thereof is dissipated in the cooling pipe 231 while flowing along the heat dissipating portion 272c. The working fluid F flows to the state F2 where liquid and gas coexist while losing heat in the heat dissipating process, and finally returns to the heating portion 272a in a liquid state F3. The returned working fluid F is reheated by the heater 271b to repeat (circulate) the flow same as described above, and during this process, heat is transferred to the evaporator 230 to remove frost accumulated on the evaporator 230.

As such, the working fluid F flows due to the difference in pressure occurred by the heating unit 271 and rapidly circulates along the heat pipe 272. Thus, the entire section of the heat pipe 272 reaches a stable operating temperature within a short time, so that a defrosting operation can be done quickly.

On the other hand, the working fluid F in the heating portion 272a has the highest temperature during the circulation process of the heat pipe 272 in the high-temperature gas state F1. Therefore, by using convection of heat by the working fluid F in the high-temperature gas state F1, frost accumulated on the evaporator 230 can be removed more efficiently.

For example, the heating portion 272a may be disposed at a position which is relatively lower than or the same position as the lowest column of the cooling pipe 231 provided in the evaporator 230. According to this, the working fluid F of high temperature heated in the heating portion 272a can transfers heat near the lowest column of the cooling pipe 231, and also the heat can go up to be transferred to the cooling pipe adjacent to the lowest column.

On the other hand, in order for the working fluid F to circulate the heat pipe 272 with such phase change, the working fluid F must be filled in the heat pipe 272 with an appropriate amount.

In the result of an experiment, it has been checked that when the working fluid F is filled up lower than 30% of the internal volume of the heat pipe 272, the temperature of the heating unit 271 suddenly rises according to a lapse of time. This means that the working fluid F is insufficient in relation to the total internal volume of the heat pipe 272 and the heater case 271a.

In addition, it has been checked that the temperature of several columns of the heat pipe 272 fails to reach a stable operating temperature [40° C.~50° C. (−21° C. freezing condition)] when the working fluid F is filled up exceeding 40% of the internal volume of the heat pipe 272. This may be understood as the amount of working fluid F is excessive in relation to the internal volume of the heat pipe 272, and thus sections in which the working fluid F flows in a liquid state are increased.

It has been checked that when the working fluid F is filled up by more than 30% and less than 40% in relation to the internal volume of the heat pipe 272, the temperature of the respective columns of the heat pipe 272 reaches to a stable operating temperature.

At this time, the temperature of each column of the heat pipe 272 gets higher as the heat pipe 272 is closer to the front of the heating portion 272a based on the flow direction of the working liquid F, and the temperature that of gets lower as the heat pipe 272 is closer to the rear of the heating portion 272a. As the amount of the filled working fluid F decreases, the difference between the temperature at the heating portion 272a (the highest temperature) and the temperature at the rear of the heating portion 272a (the lowest temperature) also decreases.

Therefore, the working fluid F is filled up by more than 30% and less than 40% with respect to the total internal volume of the heat pipe 272 and the heater case 271a, but the filling amount of the working fluid F optimized for each defrosting apparatus 270 may be selected according to the heat transferring structure, stability, etc. of the defrosting apparatus 270.

Hereinafter, other embodiments of the heating unit 271 illustrated in FIG. 6 will be described. For reference, in order to reduce duplication or repetition of descriptions, it will be described only for the parts that are structurally different from the first embodiment in the descriptions of the other embodiments.

Figure 19:
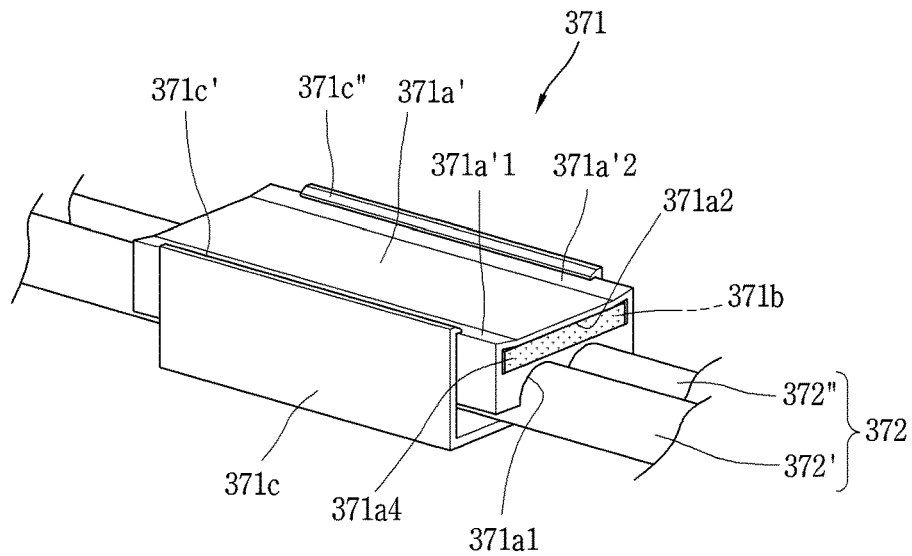
FIG. 19 is a conceptual view illustrating a second embodiment of a heating unit illustrated in FIG. 6.

FIG. 19 is a conceptual view illustrating a second embodiment of the heating unit 271 illustrated in FIG. 6.

As shown in the first embodiment, in the structure in which the lower portion of the heat pipe 272 is seated on the heat pipe seating part 271a1 of the heater case 271a and the holder 271c is disposed to cover the upper portion of the heat pipe 272, frost may accumulate on the upper surface of the holder 271c. The frost accumulated on the upper surface of the holder 271c lowers the temperature of the working fluid F in the heat pipe 272 located just below the upper surface of the holder 271c. Therefore, it may be a factor to reduce the thermal efficiency of the heater 271b.

In order to overcome this problem, a heating unit 371 in which positions of the heater case 371a and the holder 371c are reversed may be considered. As illustrated, the heat pipe seating part 371a1 is disposed to cover the upper portion of the heat pipe 372, and the holder 371c is disposed to cover the lower portion of the heat pipes 372.

The heater receiving part 371a2 is provided just below the upper surface of the heater case 371a. That is, the upper surface of the heater case 371a defines the heater receiving part 371a2. The heater receiving part 371a2 is located over the heat pipe seating part 371a1.

By this arrangement, heat generated in the heater 371b is used not only to heat the working fluid F but also to remove frost accumulated on the heater case 371a. Therefore, the thermal efficiency of the heater 371b can be improved.

Figure 20:
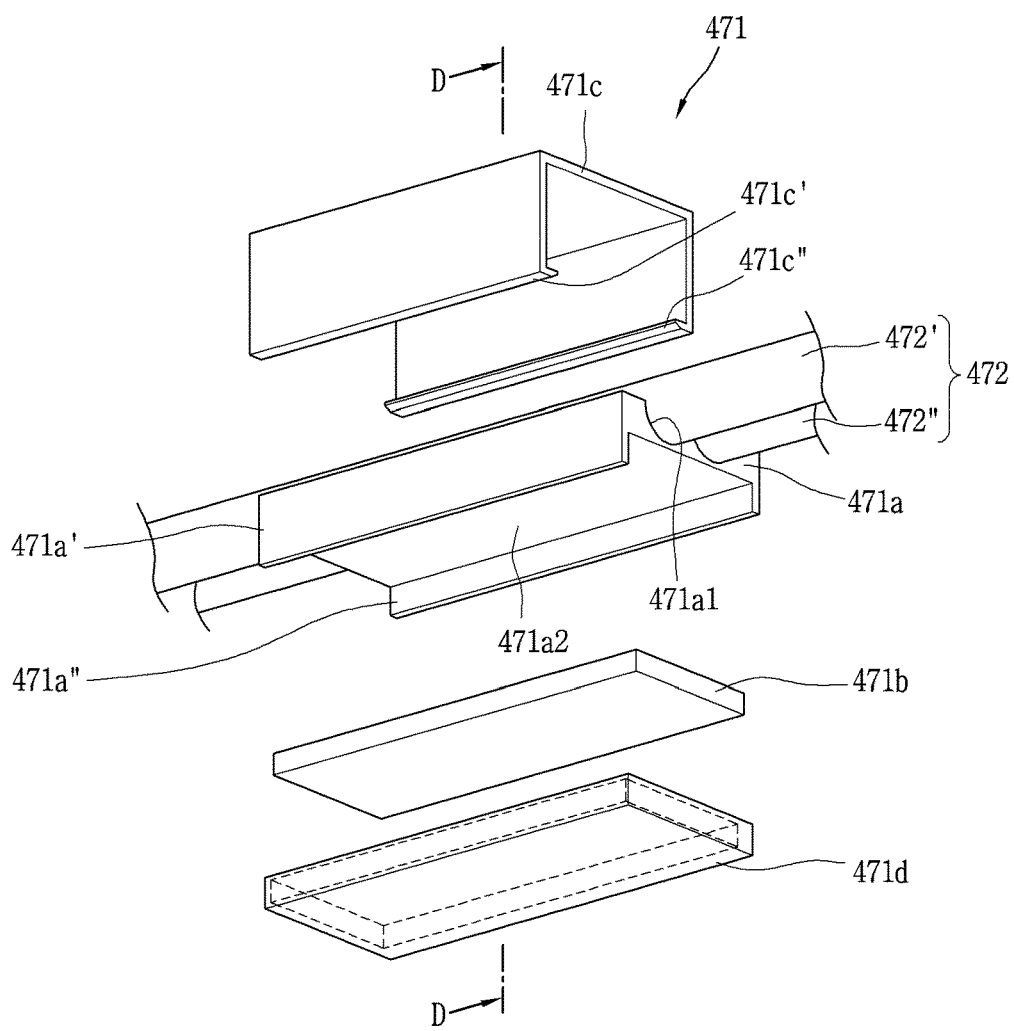
FIG. 20 is a conceptual view illustrating a third embodiment of the heating unit illustrated in FIG. 6.
Figure 21:
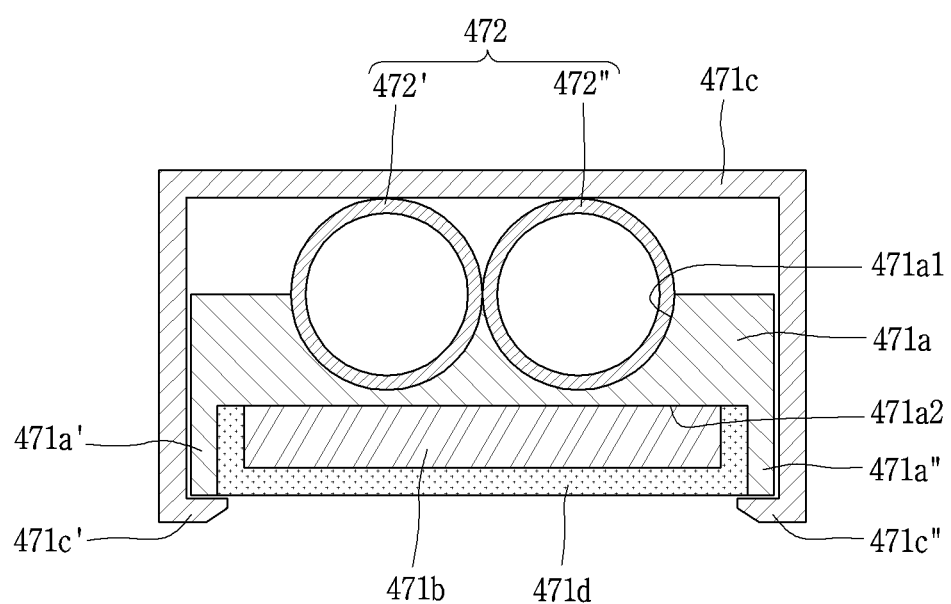
FIG. 21 is a sectional view illustrating a heater case illustrated in FIG. 20, taken along the line D-D.

FIG. 20 is a conceptual view illustrating a third embodiment of the heating unit 371 illustrated in FIG. 6, and FIG. 21 is a sectional view of the heater case 471a illustrated in FIG. 20, taken along the line D-D.

Referring to FIGS. 20 and 21, first and second extension pins 471a' and 471a" at both side of the heater case 471a protrude downward from the bottom surface to the lower portion of the heater case 471a, respectively. The first and second extension pins 471a' and 471a" may extend along a lengthwise direction of the heater case 471a.

Accordingly, a heater mounting portion 471a2 defined by the first and second extension pins 471a' and 471a" is formed at the lower part of the heater case 471a. The heater mounting portion 471a2 has a shape recessed upward in the lower part of the heater case 471a.

The heater case 471a may be formed by extrusion molding, and in this case, the heater mounting portion 471a2 may be formed during the extrusion molding. In this case, the heater mounting portion 471a2 is formed to extend in a direction of extrusion molding, that is, in the lengthwise direction (from one end to another end) of the heater case 471a.

Alternatively, the heat mounting portion 471a2 may also be configured by cutting one surface of the heater case 471a.

A heater 471b is attached to the bottom surface of the heater case 471a defining the heater mounting portion 471a2. Both sides of the heater 471b attached to the bottom surface of the heater case 471a are covered and hidden by the first and second extension pins 471a' and 471a". With the structure, even if defrosted water generated by a defrosting operation falls on the heater case 471a and flows down along side surfaces of the heater case 471a, the defrosted water does not penetrate into the heater 471b accommodated in an inner space between the first and second extension pins 471a' and 471a".

With the heater 471b attached to the heater mounting portion 471a2, a recessed space formed by the first and second extension pins 471a' and 471a" may be filled with a sealing member 471d for sealing the heater 471b. Silicon, urethane, epoxy, or the like may be used as the sealing member 471d. For example, liquid epoxy may be filled in the recessed space to cover the heater 471b, and then cured to complete a sealing structure of the heater 471b. In this case, the first and second extension pins 471a' and 471a" function as sidewalls defining the recessed space in which the sealing member 471d is filled.

Figure 22:
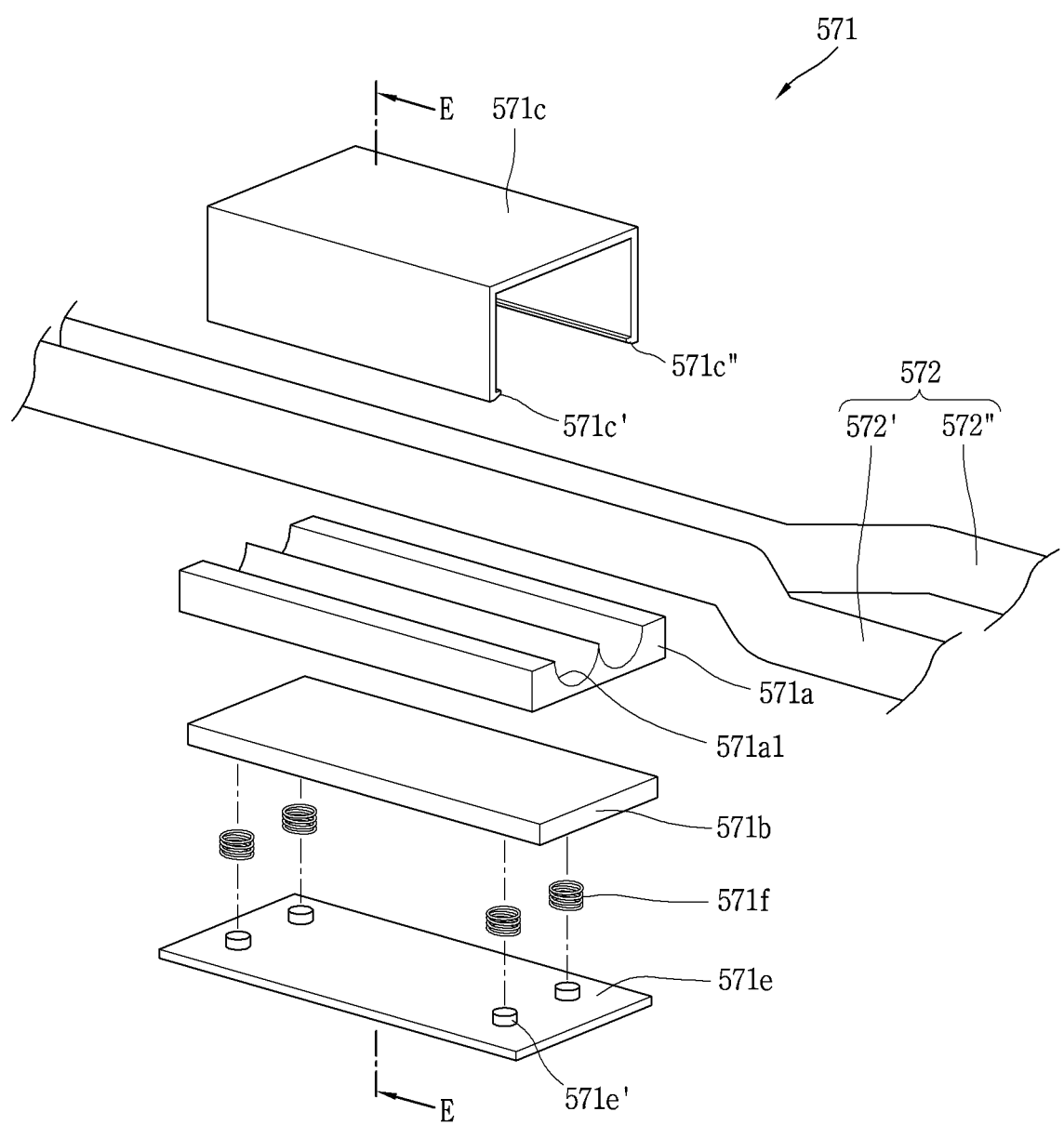
FIG. 22 is a conceptual view illustrating a fourth embodiment of a heating unit illustrated in FIG. 6.
Figure 23:
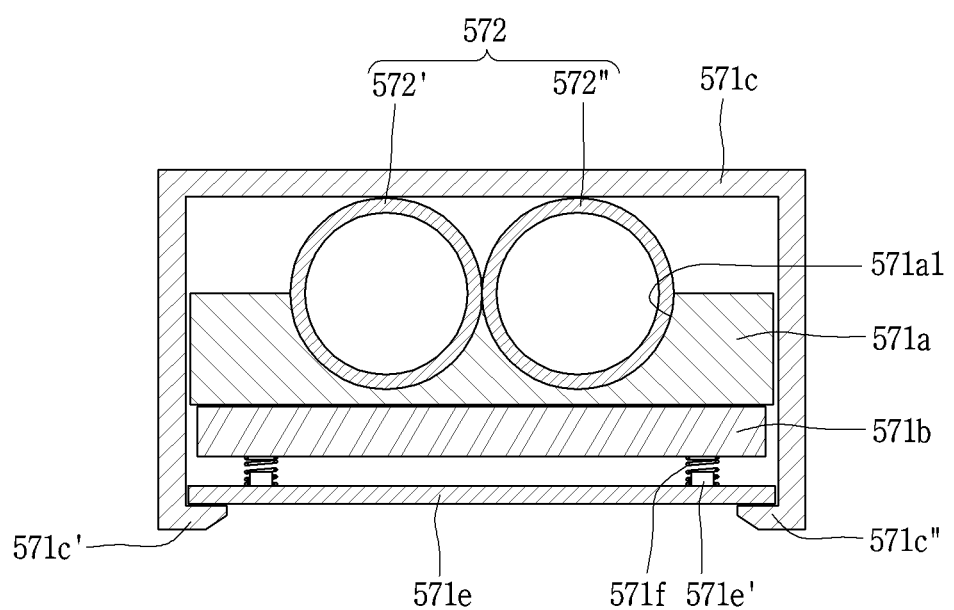
FIG. 23 is a sectional view illustrating the heating unit illustrated in FIG. 22, taken along the line E-E.

FIG. 22 is a conceptual view illustrating a fourth embodiment of the heating unit 271 illustrated in FIG. 6, and FIG. 23 is a sectional view of the heating unit 571 illustrated in FIG. 22, taken along the line E-E.

Referring to FIGS. 22 and 23, the heating unit 571 includes a heater case 571a, a heater 571b, a holder 571c, a supporting member 571e, and an elastic member 571f.

The heater case 571a is provided with a heat pipe seating part 571a1 extending in a recessed shape on one surface of the heater case 571a. The lower portion of the heat pipe 572 is seated on the heat pipe seating part 571a1.

The heater 571b is attached to the heater case 571a so as to heat the working fluid F in the inner flow path 571a1. This drawing illustrates that the heater 571b is attached to the bottom surface of the heater case 571a. However, the present disclosure is not necessarily limited to this example. The heater 571b may alternatively be attached to a top or side surface of the heater case 571a.

The holder 571c is detachably coupled to the heater case 571a so as to cover the upper portion of the heat pipe 572. The holder 571c may be formed of a synthetic resin material or a metal material which may be elastically deformed to a predetermined level.

First and second hooks 571c1' and 571c1" may be formed on both side of the holder 571c. This drawing illustrates that the holder 571c is disposed to cover the upper surface and both side surfaces of the heater case 571a, and the first and second hooks 571c1' and 571c1" protrude inwardly from both side surfaces of the holder 571c.

The supporting member 571e is supported by the first and second hooks 571c1' and 571c1" of the holder 571c, and is disposed to face the heater 571b attached to the other surface of the heater case 571a. The supporting member 571e may be formed of a disk shape and formed of a synthetic resin material or a metal material.

The elastic member 571f is interposed in a compressed state between the heater 571b and the supporting member 571e, and is configured to make the heater 571b to press towards the heater case 571a. The elastic member 571f may be provided by at least one in number along a lengthwise direction of the heater 571b. A spring may be used as the elastic member 571f.

A fixing protrusion 571e' for fixing the elastic member 571f may protrude from the supporting member 571e. The elastic member 571f may be mounted on the fixing protrusion 571e' and fixed at a specific position. As illustrated, the fixing protrusion 571e' may be fitted to the elastic member 571f. That is, the elastic member 571f may be formed to surround the fixing protrusion 571e'.

The structure may allow the heater 571b to be firmly attached to the heater case 571a. As a result, more heat generated in the heater 571b can be transferred to the heater case 571a and be used to heat the working fluid F.

Figure 24:
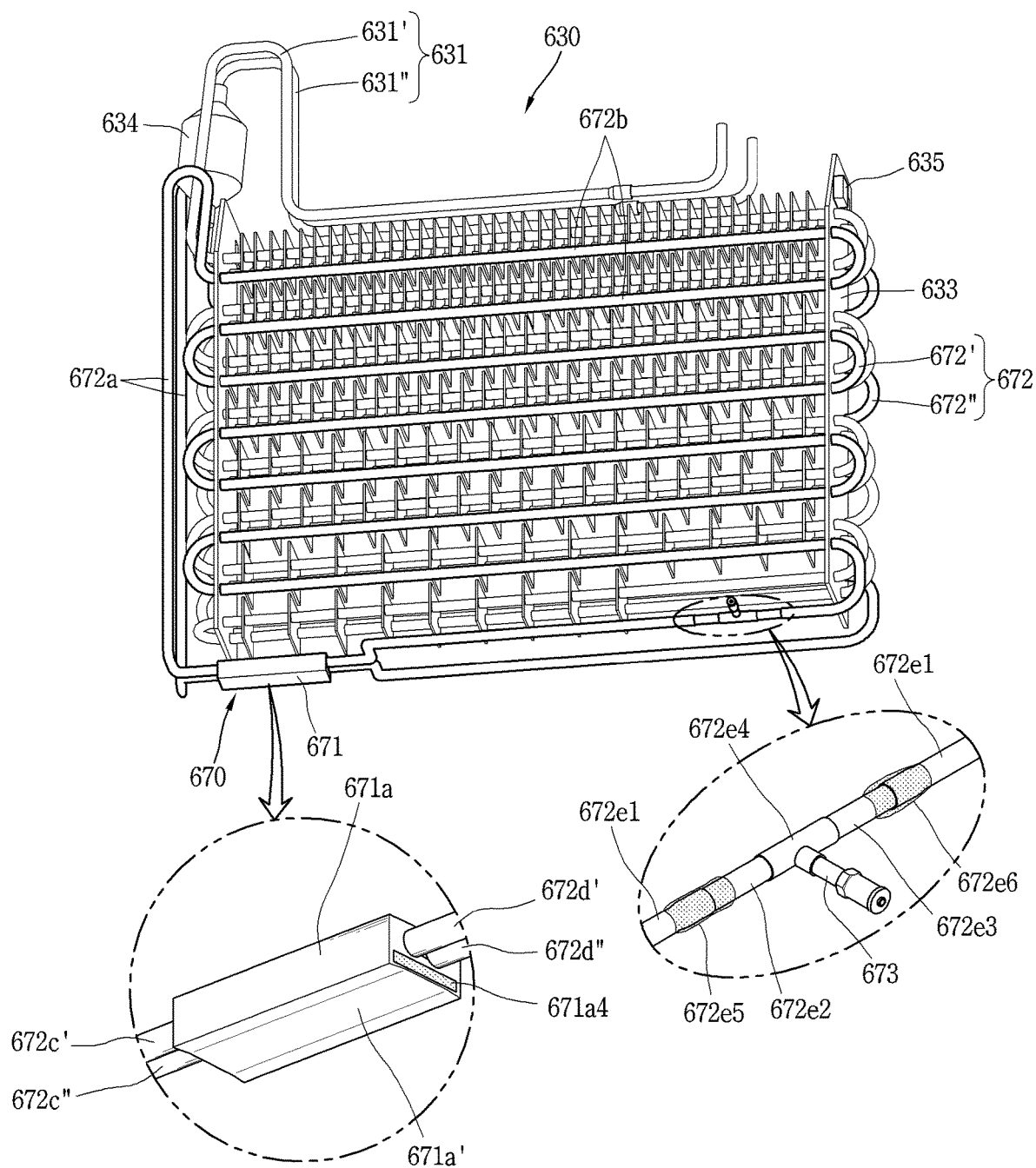
FIG. 24 is a perspective view illustrating another example of a defrosting apparatus applied to a refrigerator in FIG. 4.
Figure 25:
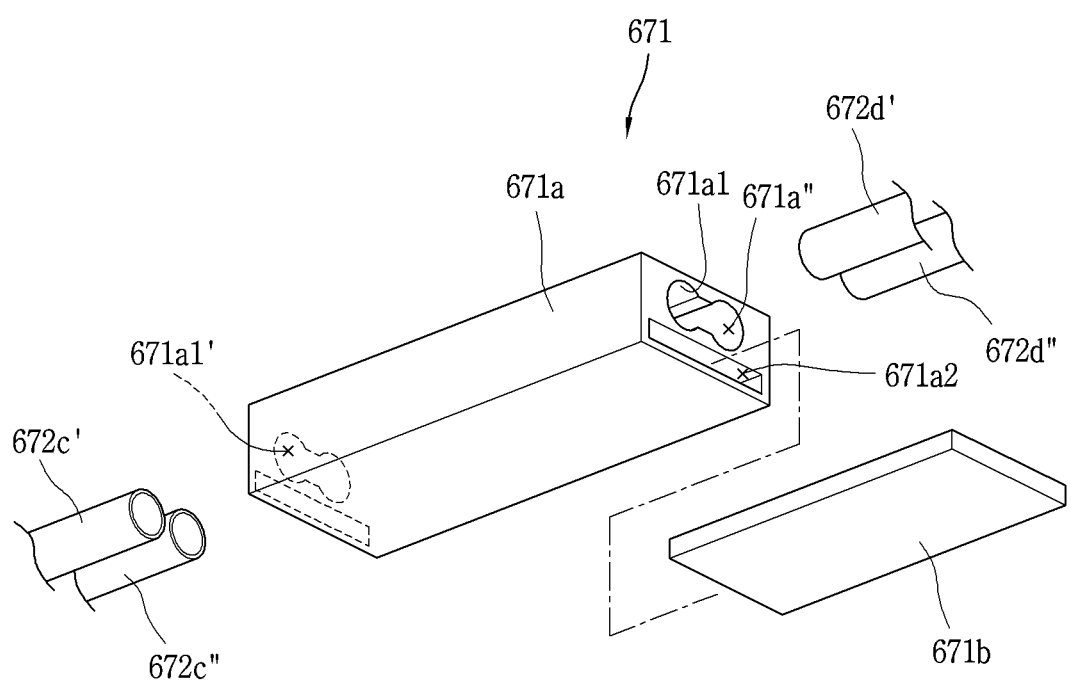
FIG. 25 is an exploded view illustrating a heating unit illustrated in FIG. 24.
Figure 26:
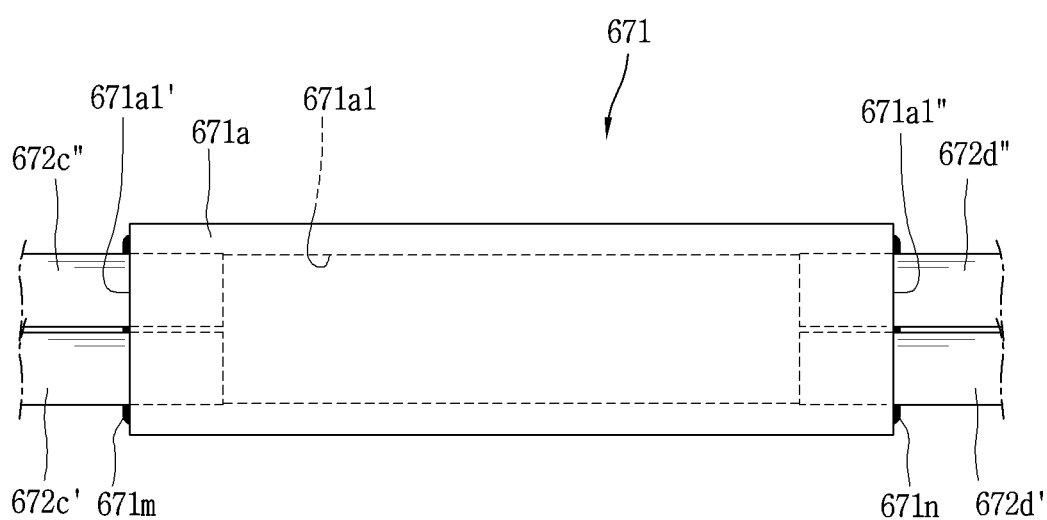
FIG. 26 is a conceptual view illustrating a connection structure between a heater case and a heat pipe illustrated in FIG. 25.

FIG. 24 is a perspective view illustrating another example of the defrosting apparatus 270 applied to the refrigerator 200 in FIG. 4, FIG. 25 is an exploded view of the heating unit 671 illustrated in FIG. 24, and FIG. 26 is a conceptual view illustrating a connection structure between the heater case 671a and the heat pipe 672 illustrated in FIG. 25.

Referring to FIGS. 24 to 26, the heating unit 671 includes a heater case 671a and a heater 671b.

The heater case 671a is formed as a single body having an outlet 671a1' and an inlet 671a1" formed at both end portions in a lengthwise direction. An inner flow path 671a1 extending from the inlet 671a1" toward the outlet 671a1' is formed inside the heater case 671a. That is, the inner flow path 671a1 is formed to extend along the lengthwise direction of the heater case 671a, and is open at the both end portions of the heater case 671a to form the outlet 671a1' and the inlet 671a1", respectively.

The heater case 671a is connected to both end portions of the heat pipe 672 to form a closed loop type circulation flow path, through which the working fluid F can circulate, together with the heat pipe 672. That is, the both end portions of the heat pipe 672 are inserted into the heater case 671a through the outlet 671a1' and the inlet 671a1" so as to be in communication with the inner flow path 671a1.

Specifically, the outlet 671a1' into which one end portion 672c', 672c" of the heat pipe 672 is inserted is configured at one end portion of the heater case 671a (for example, a front end portion of the heater case 671a). The working fluid F in the inner flow path 671a1 heated by the heater 671b is discharged into the one end portion 672c', 672c" of the heat pipe 672 inserted into the outlet 671a1'.

The inlet 671a1" into which another end portion 672d', 672d" of the heat pipe 672 is inserted is configured in the another end portion of the heater case 671a (for example, a rear end portion of the heater case 671a). The working fluid F condensed while passing through the heat pipe 672 is collected back to the inner flow path 671a1 through the another end portion 672d', 672d" of the heat pipe inserted into the inlet 671a1".

The heater 671b is mounted to the heater case 671a. For example, this drawing illustrates that the heater receiving part 671a2 into which the heater 671b is inserted is provided in the heater case 671a. The heater receiving part 671a2 extends in parallel to the inner flow path 671a and is open at both ends of the heater case 671a. That is, the heater receiving part 671a2 is formed to penetrate through the heater case 671a. This drawing illustrates that the heater receiving part 671a2 is formed below the inner flow path 671a.

The heater 671b for heating the working fluid F in the inner flow path 671a1 is mounted in the heater receiving part 671a2. The heater 671b is configured to generate heat when power is supplied, and the working fluid F in the inner flow path 671a1 is heated to a high temperature by receiving the heat generated from the heater 671b.

The structure in which the heater 671b is mounted in the heater case 671a is not limited to the above structure. The heater mounting structure described in the above embodiments can be equally applied to the present embodiment.

In a structure in which the heat pipe 672 is configured by first and second heat pipes 672' and 672" forming two rows, both end portions of the first and second heat pipes 672' and 672" are connected to the outlet 671a1' and the inlet 671a1" of the inner flow path 671a1, respectively.

The inner flow path 671a1 may be formed to accommodate the first and second heat pipes 672' and 672" at once. To this end, the inner flow path 671a1 has the one outlet 671a1' and the one inlet 671a1" into which the first and second heat pipes 672' and 672" are inserted.

As shown, the outlet 671a1' and the inlet 671a1" may have a shape of a long hole. The outlet 671a1' and the inlet 671a1" may have a shape corresponding to a portion of an exterior shape of the first and second heat pipes 672' and 672".

The introduction portions 672c' and 672c" of the heat pipe 672 are inserted into the inner flow path 671a1 formed inside the heater case 671a through the outlet 671a1', and the return portions 672d' and 672d" of the heat pipe 672 are inserted into the inner flow path 671a1 through the inlet 671a1". The introduction portions 672c' and 672c" and the return portions 672d' and 672d" of the heat pipe 672 may be disposed to face each other with the inner flow path 671a1 interposed therebetween.

The gap between the heat pipe 672 and the heater case 671a may be filled by welding. Specifically, a first welding portion 671m is formed to fill a gap between the introduction portion 672c', 672c" and the outlet 671a1', and a second welding portion 671n is formed to fill a gap between the return portion 672d', 672d" and the inlet 671a1".

As illustrated, when the first and second introduction portions 672c' and 672c" are inserted into the outlet 671a1' with being arranged in parallel, the first welding portion 671m is formed to fill both a gap between the first introduction portion 672c' and the first outlet 671a3', and a gap between the second introduction portion 672c" and the second outlet 671a3" together. Therefore, the first and second introduction portions 672c' and 672c" may be fixed to the heater case 671a by being welded at once.

Likewise, when the first and second return portions 672d' and 672d" are inserted into the inlet 671a1" with being arranged in parallel, the second welding portion 671n is formed to fill both a gap between the first return portion 672d' and the first inlet 671a2', and a gap between the second return portion 672d" and the second inlet 671a2" together. Therefore, the first and the second return portions 672d' and 672d" may be fixed to the heater case 671a by being welded once.

As such, when welding the gaps between the first and second introduction portions 672c' and 672c" formed in parallel and the outlet 671a1' at once, and welding the gaps between the first and the second return portions 672d' and 672d" formed in parallel and the inlet 671a1" at once, the amount of welding points can be further reduced.

On the other hand, unlike the prior patent structure of the company to which this disclosure pertains, a working fluid injection hole is not provided in the heater case 671a of this embodiment. Instead, one of the first and second heat pipes 672' and 672" is provided with the working fluid injection structure described in the previous embodiment. Another one of the first and second heat pipes 672' and 672" consists of a single pipe so that both end portions are connected to the outlet 671a1' and the inlet 671a1", respectively.

To describe the working fluid injection structure in detail, any one of the first and second heat pipes 672' and 672" may include a main pipe 672e1, a first connection pipe 672e2, and a second connection pipe 672e3, and a joint pipe 672e4.

The main pipe 672e1 occupies most of the heat pipe 672 and is formed of a first material (aluminum). The main pipe 672e1 is repeatedly bent in a zigzag form to configure a plurality of steps or columns, and are disposed adjacent to the cooling pipe 631.

The first connection pipe 672e2 is formed of a second material (e.g., copper) and is continuously connected to one end portion of the main pipe 672e1 by welding. Here, the term "continuously" means that the first connection pipe 672e2 is connected to one end portion of the main pipe 672e1 in a straight line. That is, the first connection pipe 672e2 is arranged to correspond to the extending direction of one end portion of the main pipe 672e1. In addition, the first connection pipe 672e2 is horizontally welded to one end portion of the main pipe 672e1 by the arrangement, The second connection pipe 672e3 is formed of a second material (e.g., copper) and is continuously connected to the another end portion of the main pipe 672e1 by welding. Here, the term "continuously" means that the second connection pipe 672e3 is connected to the another end portion of the main pipe 672e1 in a straight line. That is, the second connection pipe 672e3 is arranged to correspond to the extending direction of the another end portion of the main pipe 672e1. In addition, the second connection pipe 672e3 is horizontally welded to the another end portion of the main pipe 672e1 by the arrangement, The first and second connection pipes 672e2 and 672e3 may be configured to have the same outer diameter as the main pipe 672e1.

Alternatively, the outer diameters of the first and second connection pipes 672e2 and 672e3 may also be set smaller than the inner diameter of the main pipe 672e1, so that a part of the first and second connection pipes 672e2 and 672e3 is inserted into the main pipe 672e1.

On the contrary, the outer diameter of the main pipe 672e1 may also be set smaller than the inner diameters of the first and second connection pipes 672e2 and 672e3, so that a part of the main pipe 672e1 is inserted into the first and second connection pipes 672e2 and 672e3.

A first adhesive portion 672e5 may be applied to cover the welding portion, after welding between the main pipe 672e1 and the first connection pipe 672e2 is completed. Similarly, a second adhesive portion 672e6 may be applied to cover the welding portion, after welding between the main pipe 672e1 and the second connection pipe 672e3 is completed. The first and second adhesive portions 672e5 and 672e6 may be formed of epoxy material.

The joint pipe 672e4 is formed of a second material (for example, copper), and has a first connection portion 672e4a connected to the first connection pipe 672e2, a second connection portion 672e4b connected to the second connection pipe 672e3, and a working fluid injection portion 672e4c in communication with the first and second connection portions 672e4a and 672e4b.

That is, the joint pipe 672e4 is interposed between the first connection pipe 672e2 and the second connection pipe 672e3, and configured to be able to inject the working fluid F into the communication space while communicating them with each other.

The first connection portion 672e4a and the second connection portion 672e4b may be disposed to face each other. Accordingly, the one end portion of the main pipe 672e1, the first connection pipe 672e2, the first connection portion 672e4a, the second connection portion 672e4b, the second connection pipe 672e3, and the another end portion of the main pipe 672e1 are arranged in order along one direction.

The working fluid injection portion 672e4c is configured to intersect with the first connection portion 672e4a and the second connection portion 672e4b, respectively. This drawing illustrates that the working fluid injection portion 672e4c protrudes in a direction perpendicular to the first and second connection portions 672e4a and 672e4b. Accordingly, the joint pipe 672e4 is configured in a T shape.

The outer diameter of the first connection pipe 672e2 may be set smaller than the inner diameter of the first connection portion 672e4a so that a part of the first connection pipe 672e2 is inserted into the first connection portion 672e4a. On the contrary, the outer diameter of the first connection portion 672e4a may be set smaller than the inner diameter of the first connection pipe 672e2 so that a part of the first connection portion 672e4a is inserted into the first connection pipe 672e2.

Similarly, the outer diameter of the second connection pipe 672e3 may be set smaller than the inner diameter of the second connection portion 672e4b so that a part of the second connection pipe 672e3 is inserted into the second connection portion 672e4b. On the contrary, the outer diameter of the second connection portion 672e4b may be set smaller than the inner diameter of the second connection pipe 672e3 so that a part of the second connection portion 672e4b is inserted into the second connection pipe 672e3.

The first connection pipe 672e2 and the first connection portion 672e4a may be interconnected by welding. In this case, since the first connection pipe 672e2 and the first connection portion 672e4a are not only the same material but also connected in a straight line and are horizontally welded, the first connection pipe 272e2 and the first connection portion 272e4a can be easily welded, and the defect rate to the welding of heterogeneous material can be reduced.

The first connection pipe 672e2 and the first connection portion 672e4a may be fastened by a screw method, or more firmly connected by welding after being fastened by a screw method.

The second connection pipe 672e3 and the second connection portion 672e4b are interconnected by welding. In this case, since the second connection pipe 672e3 and the second connection portion 672e4b are not only the same material but also connected in a straight line and are horizontally welded, the second connection pipe 272e3 and the second connection portion 272e4b can be easily welded, and the defect rate to the welding of heterogeneous material can be reduced.

The second connection pipe 672e3 and the second connection portion 672e4b may be fastened by a screw method, or more firmly connected by welding after being fastened by a screw method.

Welding direction between the main pipe 672e1 and the first connection pipe 672e2, welding direction between the first connection pipe 672e2 and the first connection portion 672e4a, welding direction between the second connection portion 672e4b and the second connection pipe 672e3, and welding direction between the second connection pipe 672e3 and the main pipe 672e1 may correspond to each other. That is, they can all be horizontally welded.

A working fluid injection pipe 673 of a second material (for example, copper) is connected to the working fluid injection portion 672e4c. The outer diameter of the working fluid injection pipe 673 may be set smaller than the inner diameter of the working fluid injection portion 672e4c so that a part of the working fluid injection pipe 673 can be inserted into the working fluid injection portion 672e4c. On the contrary, the outer diameter of the working fluid injection portion 672e4c may be set smaller than the inner diameter of the working fluid injection pipe 673 so that a part of the working fluid injection portion 672e4c can be inserted into the working fluid injection pipe 673.

The working fluid injection pipe 673 and the working fluid injection portion 672e4c may be interconnected by welding. In this case, since the working fluid injection pipe 673 and the working fluid injection portion 672e4c are not only the same material but also connected in a straight line and are horizontally welded, the working fluid injection pipe 273 and the working fluid injection portion 272e4c can be easily welded, and the defect rate to the welding of heterogeneous material can be reduced.

The working fluid injection pipe 673 and the working fluid injection portion 672e4c may be fastened by a screw method, or more firmly connected by welding after being fastened by a screw method.

The working fluid F is injected into the joint pipe 672e4 through the working fluid injection pipe 673 to fill by a predetermined amount in the heat pipe 672. After the working fluid F is filled through the working fluid injection pipe 673, the working fluid injection pipe 673 is sealed.

According to the above structure, unlike the related art structure in which the fluid injection pipe 173 made of copper is inserted into the working fluid injection portion 171a3 formed at the heater case 171a made of aluminum and vertically welded, the working fluid injection pipe 673 made of copper is inserted into the joint pipe 672e4 made of copper and horizontally welded, therefore they can be easily welded, and the defect rate to the welding of heterogeneous material can be reduced.

Although the heat pipe 672 consists of a first heat pipe 672' and a second heat pipe 672" disposed respectively at the front and rear portions of the evaporator 630, the working fluid F flowing through the first and second heat pipes 672' and 672" is mixed with each other in the inner flow path 671a1 of the heater case 671a.

Therefore, it may be sufficient that the aforementioned working fluid injection structure is provided only in any one of the first and second heat pipes 672' and 672" in order to fill the working fluid F.

As in the previous embodiment, when each of the heat pipes 272' and 272" configured by two rows is configured as a single flow path, the working fluid injection structure using T-shaped joint pipe 272a4 is provided on each of the heat pipes 272' and 272", thereby generating a total of 10 welding points (5 welding points per one heat pipe). On the other hand, as in this embodiment, since the working fluid F is mixed in the inner flow path 671a1 when it has a structure that heat pipes 272' and 272" are inserted into the outlet 671a1' and the inlet 671a1" of the inner flow path 671a1 provided in the heater case 671a and fixed by welding, only one heat pipe needs to be provided with a working fluid injection structure using a T-shaped joint pipe 672a4. In this case, a total of seven welding points are generated, and therefore three welding points can be reduced comparing to the previous structure.

On the other hand, as described above, the heat pipe 672 is repeatedly bent in a zigzag form to configure a plurality of columns, and arranged in a row with the cooling pipe 631 front and back. The heat pipe 672 may be installed to be accommodated between a plurality of cooling pins 632 fixed to the respective columns of the cooling pipe 631 or to penetrate through the plurality of cooling pins 632.

As such, the cooling pipe 631 and the cooling pins 632 are disposed adjacent to the heat pipe 672. Therefore, in order to avoid interference with the cooling pipe 631 and the cooling pins 632, the working fluid injection portion 672e4c of the joint pipe 672e4 is preferably disposed to protrude toward the front or rear of the evaporator 630.

This drawing illustrates that the above-described working fluid injection structure is disposed at the lowest column of the heat pipe 672. Cooling pins 632 may not be disposed at portions where the working fluid injection structure is located.

The working fluid injection portion 672e4c provided any one of the first and second heat pipes 672' and 672" is preferably disposed to protrude toward the front or rear of the evaporator 630, in order to avoid interference with the cooling pipe 631 and the cooling pins 632.

Figure 27:
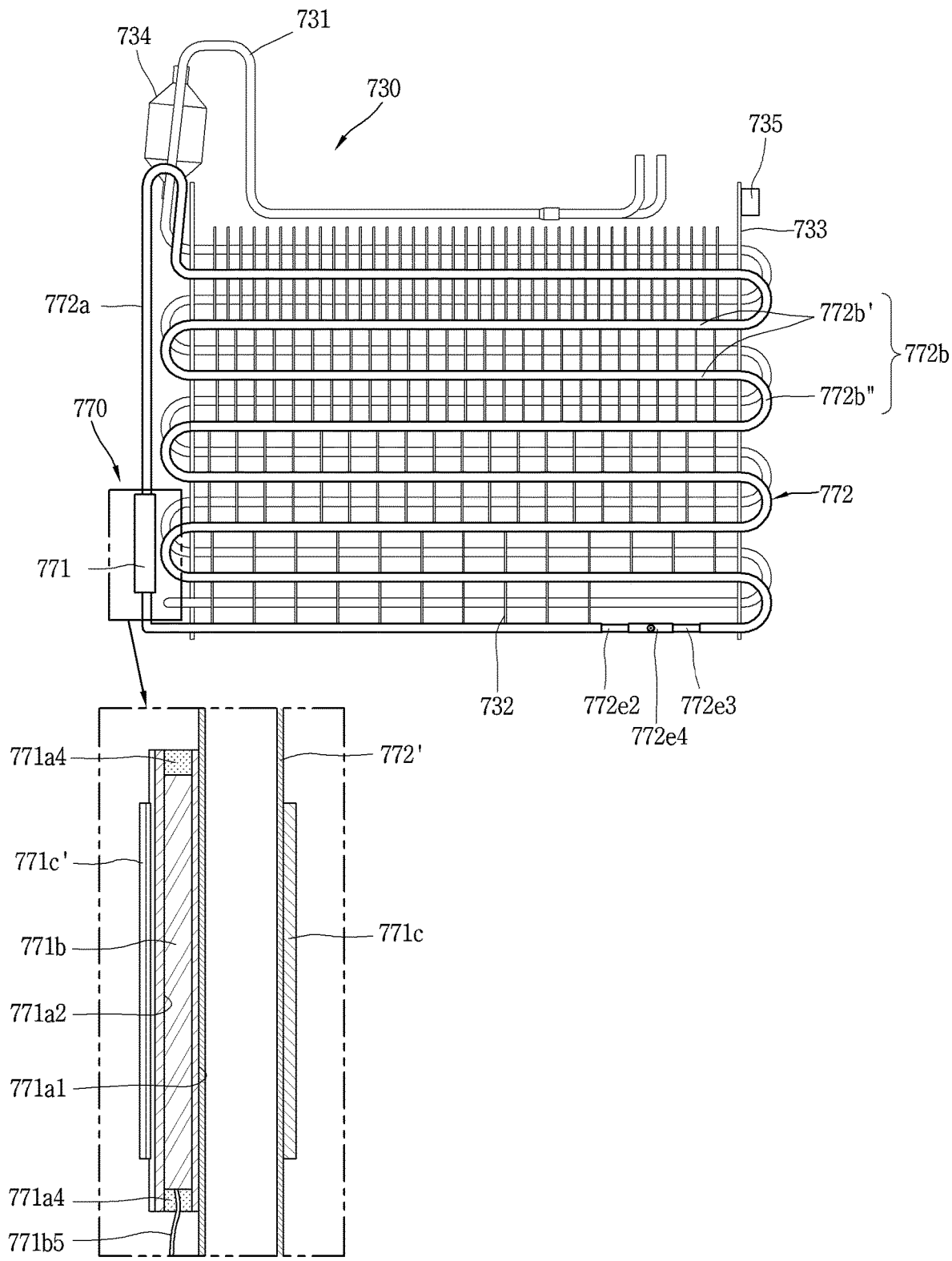
FIGS. 27 and 28 are a planar view and a perspective view illustrating another example of a defrosting apparatus applied to a refrigerator in FIG. 4.
Figure 28:
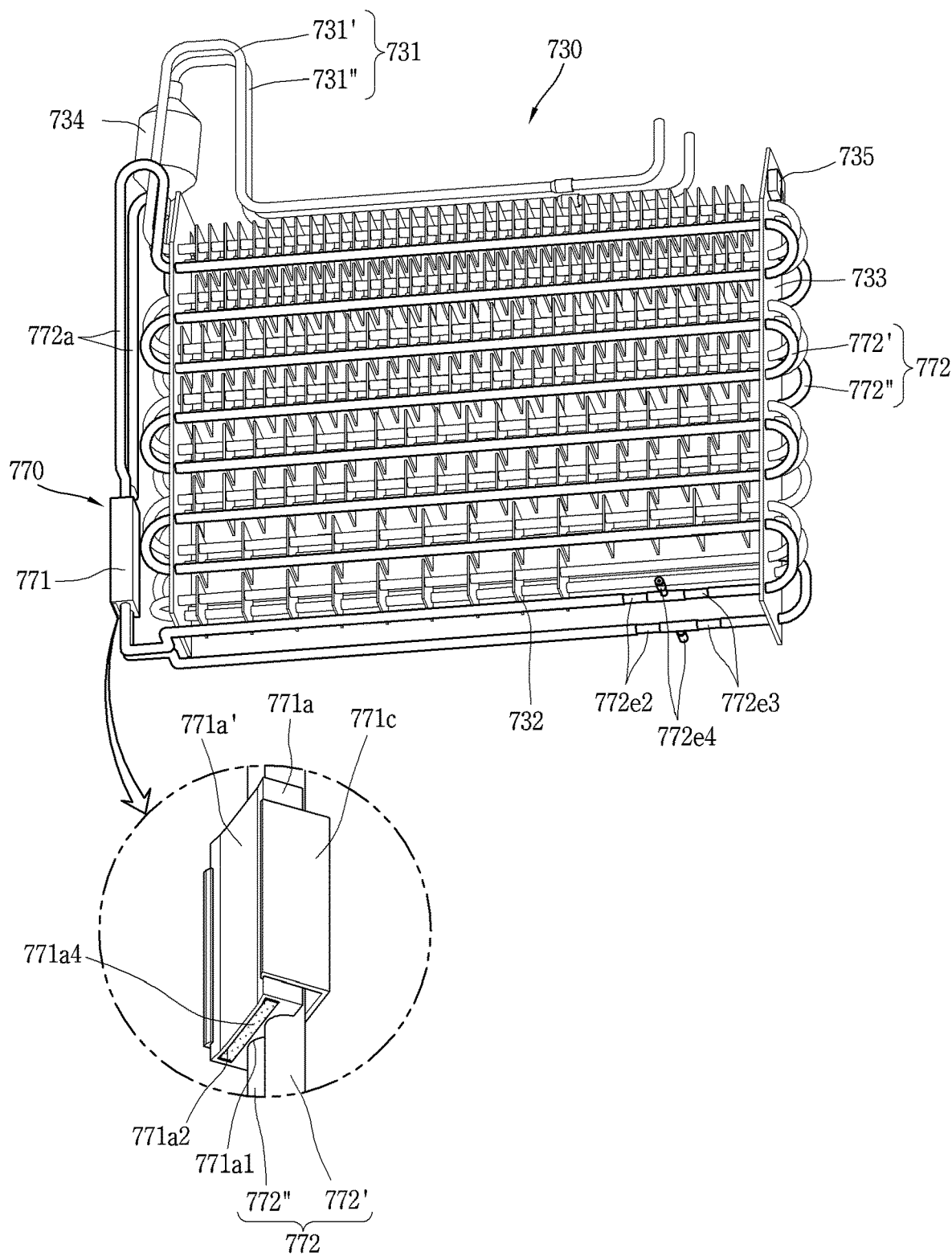

FIGS. 27 and 28 are a planar view and a perspective view illustrating another example of the defrosting apparatus 270 applied to the refrigerator 200 in FIG. 4.

Referring to FIGS. 27 and 28, the heat pipe 772 itself forms a circulation flow path through which the working fluid F can circulate. Therefore, the heat pipe 772 is provided with the working fluid injection structure described above.

A first heat pipe 272' and a second heat pipe 272" form mutually independent flow paths when the heat pipe 272 is composed of the first heat pipe 272' and the second heat pipe 272" disposed respectively at front and rear of the evaporator 230. That is, the working fluid F flowing through each of the first heat pipe 272' and the second heat pipe 272" does not mix with each other. In the above structure, the working fluid injection structure is provided in each of the first and second heat pipes 272' and 272".

A heating unit 771 may be disposed at the outside of one side of a defrosting apparatus 770. Specifically, the heater case 771a may be located at an outer side of a support 733 provided at one side of an evaporator 730, and may extend in a perpendicular direction from a lower side to an upper side of the evaporator 730.

The heater case 771a is provided with a heat pipe seating part 771a1 extending in a recessed shape on one surface of the heater case 571a. The heat pipe seating part 771a1 extends in the up-down direction of the evaporator 730 along the lengthwise direction of the heater case 771a.

The heat pipe seating part 771a1 is disposed to cover a portion of the heat pipe 772. This drawing illustrates that the heat pipe seating part 771a1 is disposed to cover the outer circumferential surface of the heat pipe 772 that faces the outer side of the evaporator 730.

A heater 771b is mounted to the heater case 771a and disposed vertically in an up-down direction of the evaporator 730. As described in the foregoing embodiments, the heater 771b may be mounted in the heater case 771a in various ways. For example, the heater 771b may be accommodated in a heater receiving part 771a2 formed to penetrate through the heater case 771a, or may be attached to one surface of the heater case 771a.

The holder 771c is detachably coupled to the heater case 771a to cover the heat pipe 772 seated on the heat pipe seating part 771a1. This drawing illustrates that the holder 771c is disposed to cover the inner circumferential surface of the heat pipe 772 that faces the support 733.

For reference, the heater receiving part 771a2 is disposed at the outer side of the heat pipe seating part 771a1 in this embodiment, the present disclosure is not necessarily limited thereto. The heater receiving part 771a2 may alternatively be disposed at an inner side of the heat pipe seating part 771a1, that is, between the heat pipe seating part 771a1 and the support 733.

The heater 771b is configured to reheat the working fluid F collected back in a cooled state through a heat dissipating process. As such, the structure in which the heating unit 771 is mounted on the heat pipe 772 extends upward, that is, in a vertical direction from the lower side to the upper side of the evaporator 730 is advantageous in that the working fluid F in the heat pipe 772 is heated to form a rising flow.

On the other hand, the working fluid F is preferably filled in higher than the uppermost column of the heater 771b extending in a vertical direction. In this configuration, a defrosting operation can be safely performed without overheating of the heater 771b, and the continuous supply of the working fluid F in the gas state to the heat pipe 772 can be made stable.

Figure 29:
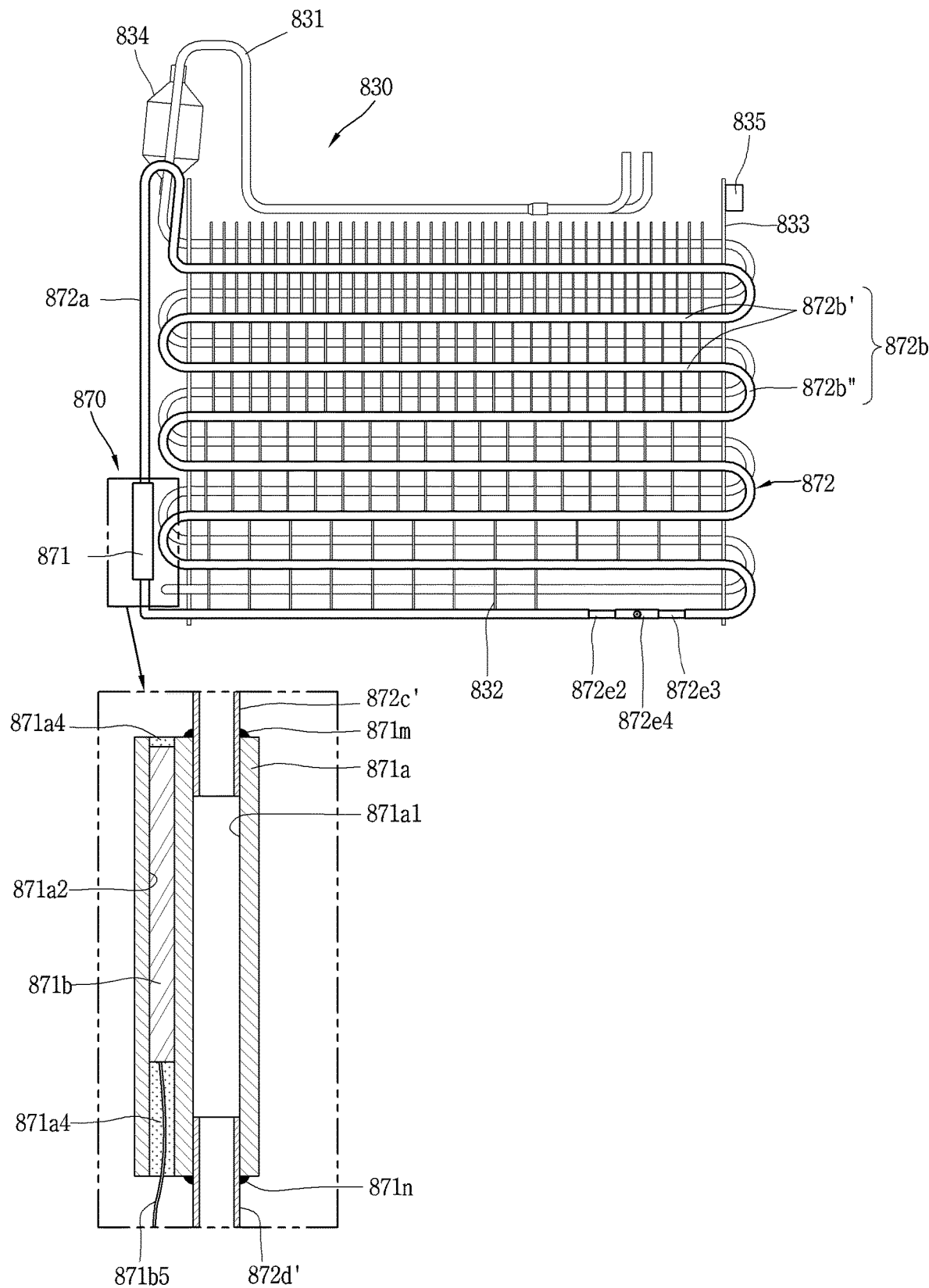
FIGS. 29 and 30 are a planar view and a perspective view illustrating another example of the defrosting apparatus applied to the refrigerator in FIG. 4.
Figure 30:
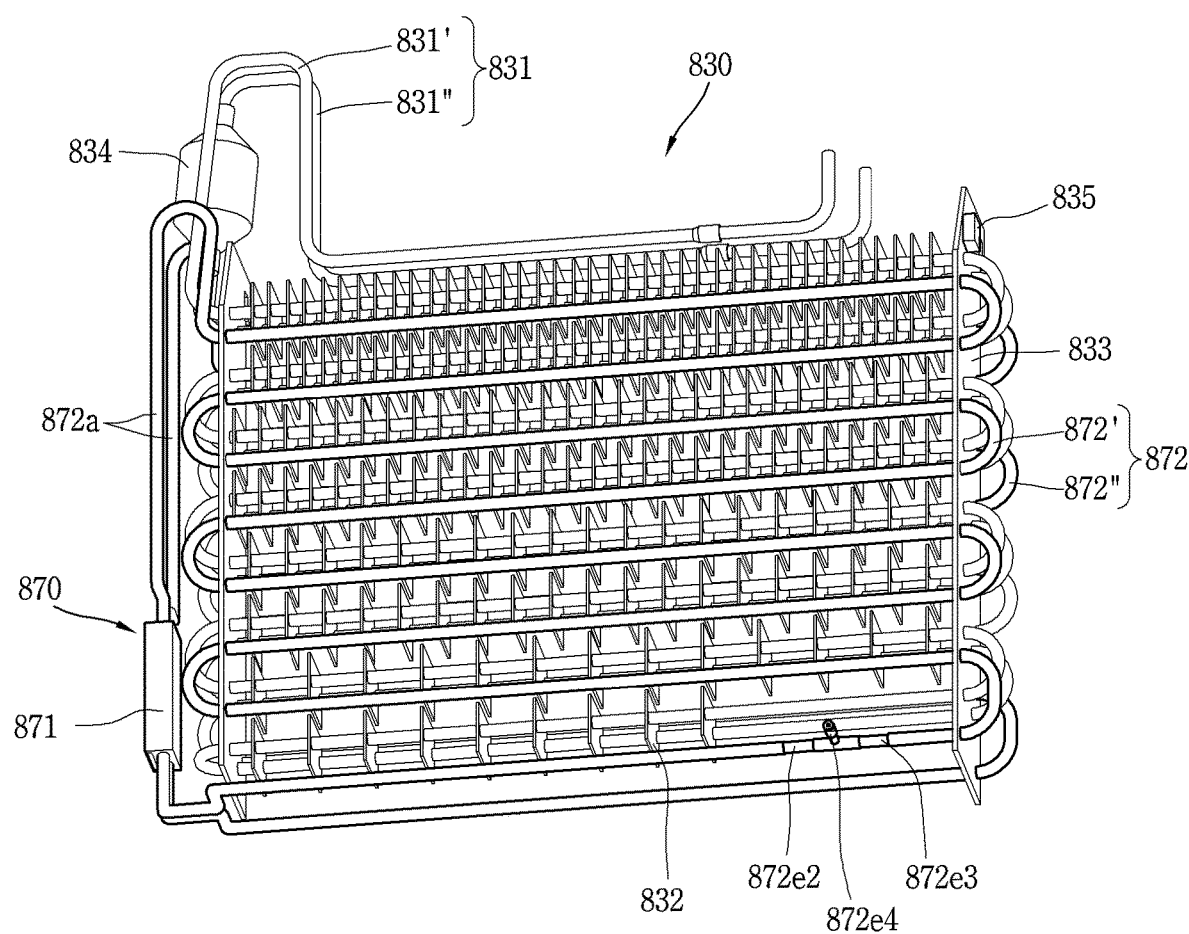

FIGS. 29 and 30 are a planar view and a perspective view illustrating another example of the defrosting apparatus 270 applied to the refrigerator 200 in FIG. 4.

The heater case 871a is connected to both end portions of the heat pipe 872, to form a circulation flow path through which the working fluid F can circulate. To this end, an outlet 871a1' and an inlet 871a1" are formed in upper and lower sides of the heater case 871a, respectively. The outlet 871a1' is connected to an extending portion 872a of the heat pipe 872, and the inlet 871a1" is connected to the lowest column of a heat dissipating portion 872b of the heat pipe 872.

The heat pipe 872 includes a first heat pipe 872' and a second heat pipe 872" disposed at the front and rear portions of the evaporator 830, respectively. In this case, the working fluid F flowing through the first and second heat pipes 872' and 872" is configured to mix with each other in the inner flow path 871a1 of the heater case 871a.

Therefore, as described with reference to FIGS. 24 to 26, it may be sufficient that the aforementioned working fluid injection structure is provided only in any one of the first and second heat pipes 872' and 872" in order to fill the working fluid F. Therefore, the amount of welding points can be reduced comparing to the structure in the previous embodiment.

A heater 871b is mounted to the heater case 871a and disposed vertically in an up-down direction of the evaporator 830. As described in the foregoing embodiments, the heater 871b may be mounted in the heater case 871a in various ways. For example, the heater 871b may be accommodated in a heater receiving part 871a2 formed to penetrate through the heater case 871a, or may be attached to one surface of the heater case 871a.

For reference, in this embodiment, the inner flow path 871a1 and the heater receiving part 871a2 are formed to penetrate through the heater case 871a, and the heater 871b is accommodated in the heater receiving part 871a2. Although this drawing illustrates that the heater receiving part 871a2 is disposed at the outer side of the inner flow path 871a1, the present disclosure is not necessarily limited thereto. The heater receiving part 871a2 may alternatively be disposed at an inner side of the inner flow path 871a1, that is, between the inner flow path 871a1 and the support 833.

The heater 871b is configured to reheat the working fluid F collected back through the inlet 871a1". As such, the structure in which the inner flow path 871a1 extends upward, that is, in a vertical direction from the lower side to the upper side of the evaporator 830 is advantageous in that the working fluid F in the inner flow path 871a1 can be heated to form a rising flow and therefore a back flow of the working fluid F can be prevented.

On the other hand, the working fluid F is preferably filled in the heater case 871a to be higher than the uppermost column of the heater 871b extending in a vertical direction. In this configuration, a defrosting operation can be safely performed without overheating of the heating unit 871, and the continuous supply of the working fluid F in the gas state to the heat pipe 872 can be made stable.

The invention claimed is:

1. A defrosting apparatus comprising:
    a heater case that comprises a heat pipe seating part that is located on one surface of the heater case in a recessed shape and a heater receiving part that extends in parallel with the heat pipe seating part;
    a heater that is mounted in the heater receiving part and that is configured to emit heat based on application of electrical current to the heater;
    a heat pipe that defines a flow path for a working fluid, wherein at least a portion of the heat pipe is seated on the heat pipe seating part,
    wherein the heat pipe is disposed adjacent to a cooling pipe of an evaporator to radiate heat to the cooling pipe by transferring the working fluid, and
    wherein the working fluid is heated by the heater in the portion of the heat pipe that is seated on the heat pipe seating part, and then transferred to the cooling pipe; and
    a holder that is detachably coupled to the heater case and that is configured to cover the portion of the heat pipe that is seated on the heat pipe seating part,
    wherein the heater case further comprises:
        a pressing member that is configured to press the heater toward an inner surface of the heater receiving part,
        a recess portion that is defined by pressing the heater towards the inner surface of the heater receiving part, and
        a plurality of locking portions connected to the recess portion and protruding from both corners of the heater case, respectively,
        wherein the holder includes first and second hooks provided at both ends and coupled to the plurality of locking portions, respectively, so as to cover the one surface and both sides of the heater case.

2. The defrosting apparatus of claim 1, wherein the heat pipe seating part has a shape that corresponds to a shape of the portion of the heat pipe.

3. The defrosting apparatus of claim 1, wherein the heat pipe seating part extends through the heater case in a lengthwise direction of the heater case.

4. The defrosting apparatus of claim 1, wherein the heat pipe is continuously disposed on the heat pipe seating part and covers an entire surface of the heat pipe seating part.

5. The defrosting apparatus of claim 1, wherein the heater receiving part penetrates through the heater case in a lengthwise direction of the heater case and has openings at both ends.

6. The defrosting apparatus of claim 1,
    wherein the holder is detachably coupled to the heater case by coupling hooks of the holder to the locking portions of the heater case.

7. The defrosting apparatus of claim 1, wherein the heater case and the holder are coupled to each other by one or more coupling members.

8. The defrosting apparatus of claim 1, wherein the heater is configured to stop, based on a determination that a current temperature of a thermistor is equal to or higher than a preset temperature, emitting heat by increasing a resistance of the thermistor and suppressing electric current that is applied to the heater.

9. A method of defrosting comprising:
    locating a heat pipe seating part of a heater case on one surface of the heater case in a recessed shape;
    extending a heater receiving part of the heater case in parallel with the heat pipe seating part;
    mounting a heater in the heater receiving part and emitting heat from the heater based on application of electrical current to the heater;
    defining a flow path, by a heat pipe, for a working fluid, wherein at least a portion of the heat pipe is seated on the heat pipe seating part,
        wherein the heat pipe is disposed adjacent to a cooling pipe of an evaporator to radiate heat to the cooling pipe by transferring the working fluid, and
        wherein the working fluid is heated by the heater in the portion of the heat pipe that is seated on the heat pipe seating part, and then transferred to the cooling pipe; and
    detachably coupling a holder to the heater case to cover the portion of the heat pipe that is seated on the heat pipe seating part,
    wherein the heater case further comprises:
        a pressing member that is configured to press the heater toward an inner surface of the heater receiving part,
        a recess portion that is defined by pressing the heater towards the inner surface of the heater receiving part, and
        a plurality of locking portions connected to the recess portion and protruding from both corners of the heater case, respectively,
        wherein the holder includes first and second hooks provided at both ends and coupled to the plurality of locking portions, respectively, so as to cover the one surface and both sides of the heater case.

10. The method of claim 9, wherein the heat pipe seating part has a shape that corresponds to a shape of the portion of the heat pipe.

11. The method of claim 9, wherein the heat pipe seating part extends through the heater case in a lengthwise direction of the heater case.

12. The method of claim 9, wherein the heat pipe is continuously disposed on the heat pipe seating part and covers an entire surface of the heat pipe seating part.

13. The method of claim 9, wherein the heater receiving part penetrates through the heater case in a lengthwise direction of the heater case and has openings at both ends.

14. The method of claim 9,
    wherein the holder is detachably coupled to the heater case by coupling hooks of the holder to the locking portions of the heater case.

15. The method of claim 9, wherein the heater case and the holder are coupled to each other by one or more coupling members.

16. The method of claim 9, wherein the heater is configured to stop, based on a determination that a current temperature of a thermistor is equal to or higher than a preset temperature, emitting heat by increasing a resistance of the thermistor and suppressing electric current that is applied to the heater.

* * * * *